(12) United States Patent
Wiesner et al.

(10) Patent No.: US 12,528,705 B2
(45) Date of Patent: Jan. 20, 2026

(54) TWO-DIMENSIONAL MESOPOROUS SUPERLATTICES OF INORGANIC MATERIALS AND METHOD OF MAKING AND USING SAME

(71) Applicant: CORNELL UNIVERSITY, Ithaca, NY (US)

(72) Inventors: Ulrich B. Wiesner, Ithaca, NY (US); Kai Ma, Belle Mead, NJ (US); Tangi Aubert, Ghent (BE)

(73) Assignee: Cornell University, Ithaca, NY (US)

( * ) Notice: Subject to any disclaimer, the term of this patent is extended or adjusted under 35 U.S.C. 154(b) by 918 days.

(21) Appl. No.: 17/765,766

(22) PCT Filed: Oct. 5, 2020

(86) PCT No.: PCT/US2020/054298
§ 371 (c)(1),
(2) Date: Mar. 31, 2022

(87) PCT Pub. No.: WO2021/067955
PCT Pub. Date: Apr. 8, 2021

(65) Prior Publication Data
US 2022/0363553 A1  Nov. 17, 2022

Related U.S. Application Data

(60) Provisional application No. 62/910,186, filed on Oct. 3, 2019.

(51) Int. Cl.
C01B 33/00 (2006.01)
C01B 33/18 (2006.01)
C01B 33/26 (2006.01)

(52) U.S. Cl.
CPC .............. C01B 33/18 (2013.01); C01B 33/26 (2013.01); *C01P 2002/01* (2013.01); *C01P 2002/30* (2013.01); *C01P 2006/16* (2013.01)

(58) Field of Classification Search
None
See application file for complete search history.

(56) References Cited

U.S. PATENT DOCUMENTS

| 2013/0184147 A1 | 7/2013 | Ryoo et al. | |
| 2015/0087044 A1* | 3/2015 | Ma | C12N 9/0065 435/188 |

OTHER PUBLICATIONS

Zhao, continuous mesoporous silica films with highly ordered large pore structures, Adv Mater., 10, 16, pp. 1380-1385 (Year: 1998).*

(Continued)

*Primary Examiner* — Stefanie J Cohen

(57) ABSTRACT

Porous compositions and methods of making and using same. The compositions may be one or more layer(s) of mesoporous inorganic materials. The mesoporous inorganic material(s) may be a plurality of inorganic nanocages, which may be microporous. A composition may include homostacks of layers of the same inorganic mesoporous materials. A composition may include heterostacks of layers of inorganic mesoporous materials, where at least two of the layers are different. The compositions may be surface functionalized. The compositions may be formed in a reaction mixture including one or more precursor(s), one or more surfactant(s), water, and one or more organic solvent(s). The compositions may be formed at the liquid-liquid interface between the water and the one or more organic solvent(s). A composition may be used as a catalyst, in a catalytic method, as a separation medium, in a separation method, in nanomedicine applications, or the like.

21 Claims, 15 Drawing Sheets

(56) References Cited

OTHER PUBLICATIONS

Wang et al, the growth mechanism of continuous cubic mesoporous SBA-16 film with large area of highly ordered pores, OP publishing, pp. 1-4 (Year: 2007).*

Zhu, et al., "3D Graphene Nanostructure composed of porous carbon sheets and interconnected nanocages for high-performance lithium-ion battery anodes and lithium-sulfur bateries," ACS Sustainable Chem. Eng., 2019, 7, all enclosed pages cited.

* cited by examiner

TWO-DIMENSIONAL MESOPOROUS SUPERLATTICES OF INORGANIC MATERIALS AND METHOD OF MAKING AND USING SAME

CROSS REFERENCE TO RELATED APPLICATIONS

This application is a U.S. national phase entry of International Application No. PCT/US2020/054298 filed Oct. 5, 2020, which claims priority to U.S. Provisional Application No. 62/910,186, filed on Oct. 3, 2019. The disclosures of which is are hereby incorporated by reference in their entirety.

STATEMENT REGARDING FEDERALLY SPONSORED RESEARCH

This invention was made with government support under contract no. DE-SC$_{0010560}$ awarded by the Department of Energy. The government has certain rights in the invention.

BACKGROUND OF THE DISCLOSURE

Despite extensive studies on mesoporous silica since the early 1990's, the synthesis of two-dimensional (2D) silica nanostructures remains challenging. Since the early reports on directed silica self-assembly, these materials and their derivatives in the bulk, as films, and as nanoparticles have been the subject of extensive research efforts. Benign synthesis conditions, often in aqueous solutions at room temperature, concomitant low toxicity and favorable biocompatibility, continuous structure discovery, as well as their application potential across different areas, e.g., in catalysis, energy, and nanomedicine, maintain high academic and industrial interest levels. Facile pore accessibility makes cage-like mesoporous silica particularly interesting. Recently, individual silica cages, grown around single organic molecule-swollen micelles, where isolated. However, fundamental understanding of how order emerges from a single cage to a 3D superstructure remains limited.

Base-catalyzed hydrolysis of alkoxysilane precursors in water produces primary silica clusters of about 2 nm diameter that can further condense to form ultrasmall (<10 nm) silica nanoparticles. In the presence of cationic surfactants such as cetyltrimethylammonium bromide (CTAB), negatively charged clusters self-assemble into micelle-templated mesoporous silica, with sizes controllable down to single pore nanoparticles. The addition of a pore expander increases micelle size, size dispersity, and deformability, enabling cage-like mesoporous structures. Numerous studies have identified bulk mesoporous materials formed from such cages as basic building blocks, including $5^{12}$, $5^{12}6^2$, or $5^{12}6^3$ cages, where $5^x6^y$ refers to a cage made of x pentagonal and y hexagonal faces. In contrast, details of the self-assembly processes involved in their formation remains obscure.

SUMMARY OF THE DISCLOSURE

The present disclosure provides compositions. Also provided are methods of making and uses of the compositions.

In an aspect, the present disclosure provides compositions. A composition is porous. A composition may be a porous superlattice comprising an inorganic mesoporous material (e.g., one or more layers of a 2D inorganic material). The inorganic mesoporous material may also be microporous. In various examples, a composition comprises one or more layer(s) of a porous inorganic material. The individual layers of porous inorganic material may each comprise 1 to 100 monolayers of mesoporous inorganic nanocages. The individual layers of the porous inorganic material and/or the mesoporous inorganic material(s) may be the same (e.g., a homostack). The individual layers of the porous inorganic material may be different than one or more or all of the other layers and/or one or more or all of the mesoporous inorganic material(s) may be different than one or more or all of the other mesoporous inorganic material(s) (e.g., a heterostack). A composition can have various forms. In various examples, a composition is a monolith, a free-standing membrane, or the like. The individual layers of a composition can be various materials. In various examples, the individual layers of porous inorganic material (e.g., mesoporous inorganic material) are a layer of silica mesoporous material, aluminosilicate mesoporous material, transition metal oxide mesoporous material, metal mesoporous material, or the like, or a combination thereof. An individual layer of a composition may be functionalized.

In an aspect, the present disclosure provides methods of making compositions of the present disclosure. The compositions (or individual layers of porous inorganic material) may be formed in a reaction mixture including one or more precursor(s), one or more surfactant(s), water, optionally, one or more pH modifying agent(s), and one or more organic solvent(s). A composition (or individual layer of porous inorganic material) may be formed at the liquid-liquid interface between the water and organic solvent. A method may further comprise isolation/separation of at least a portion of the composition from the reaction mixture. A method may further comprise stacking of two or more compositions (or two or more individual layers of porous inorganic material), each of which may be from different reaction mixtures. The compositions may be the same or at least two of the compositions are different.

In an aspect, the present disclosure provides uses of compositions of the present disclosure. In various examples, one or more composition(s) is/are used as: catalyst/catalysts/ in catalytic methods; separation media/in separation methods; in nanomedicine applications, as a substrate, for example, for supported lipid-bilayer biomaterials, or the like.

BRIEF DESCRIPTION OF THE FIGURES

For a fuller understanding of the nature and objects of the disclosure, reference should be made to the following detailed description taken in conjunction with the accompanying figures.

TEM image revealing a mono-layer superlattice with well-ordered honeycomb structure.

Figure 2:
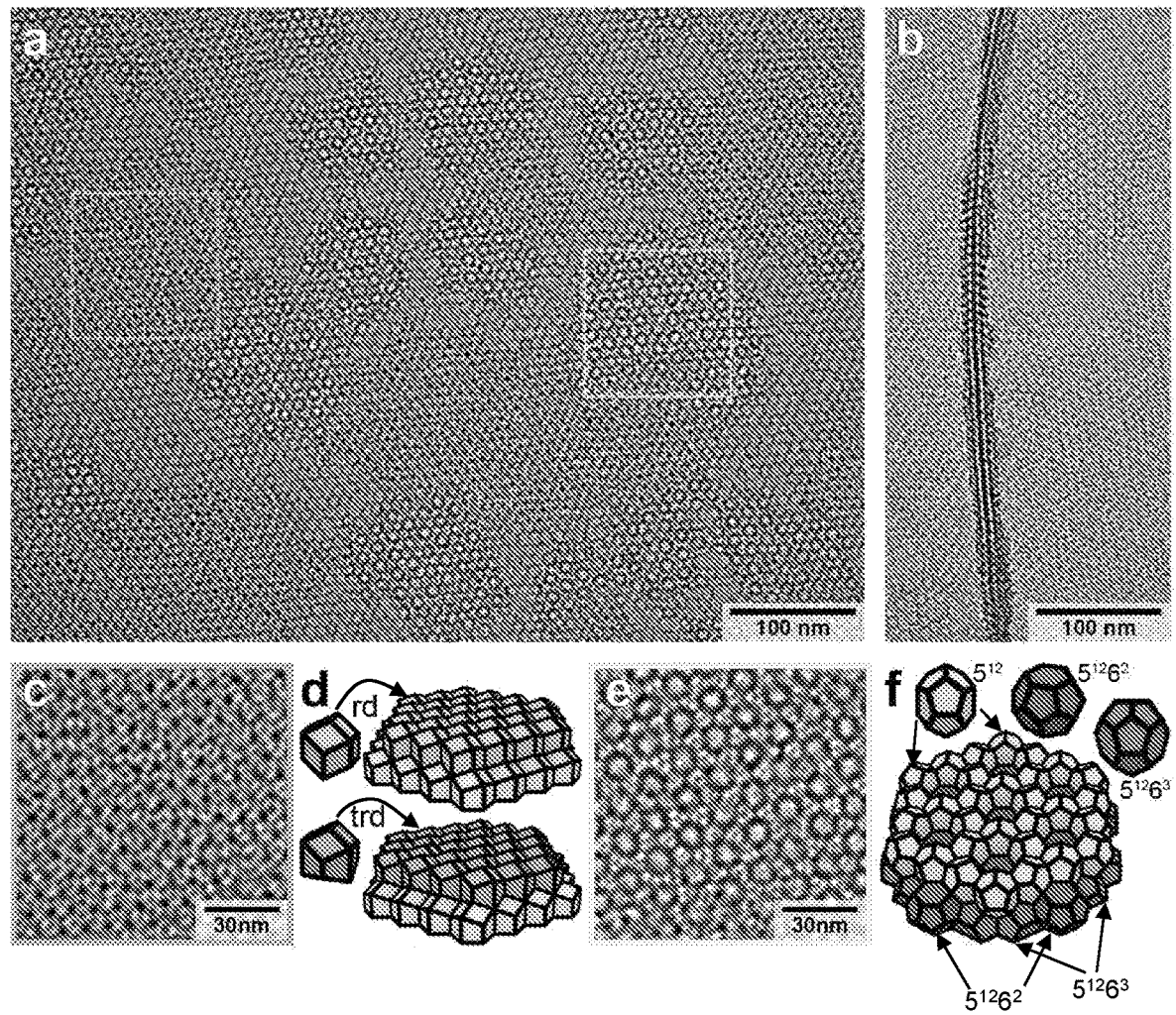

FIG. 2 shows the structure of directly grown bilayer silica cage superlattices having two monolayers of silica nanocages. (a-b) TEM images of a superlattice with bilayer islands (a) and corresponding lateral view from a fold (b). (c-f) TEM zoom-ins (c (left inset) and e (right inset)) and illustrations (d and f) of bilayer structures resulting from the close packing of equal spheres, built from either rhombic dodecahedral (rd) and trapezo-rhombic dodecahedral (trd) cages (c,d), or from the packing of unequal spheres, built from $5^{12}$, $5^{12}6^2$, and $5^{12}6^3$ cages (e and f).

Figure 3:
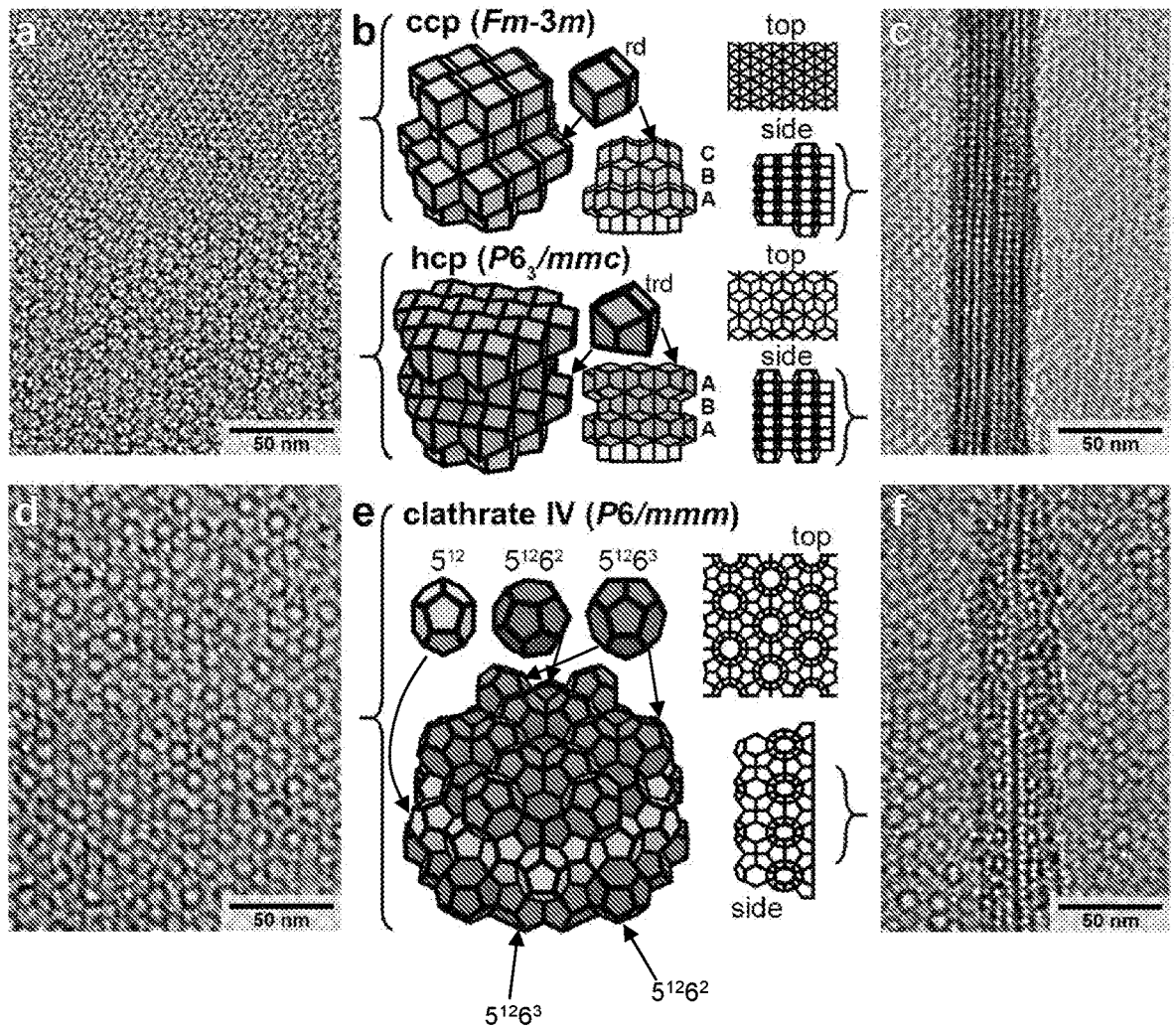

FIG. 3 shows TEM images and illustrations of examples of multilayer silica cage superlattices having more than two monolayers of silica nanocages. (a) TEM image of a superlattices exhibiting ccp (upper part) and hcp (lower part) structures. (b) Illustration of ccp (top) and hcp (bottom) structures built from rhombic dodecahedral (rd) and trapezo-rhombic dodecahedral (trd) cages, respectively, and representative simulated top and side view projections. (c) TEM image of a fold in a hcp/ccp superlattice providing a double lateral view. (d) TEM image of a superlattice exhibiting the clathrate IV structure. (e) Illustration of the corresponding superlattice derived from three different cage motifs and simulated top and side view projections. (f) TEM image of a fold in a clathrate IV superlattice providing a double lateral view.

Figure 4:
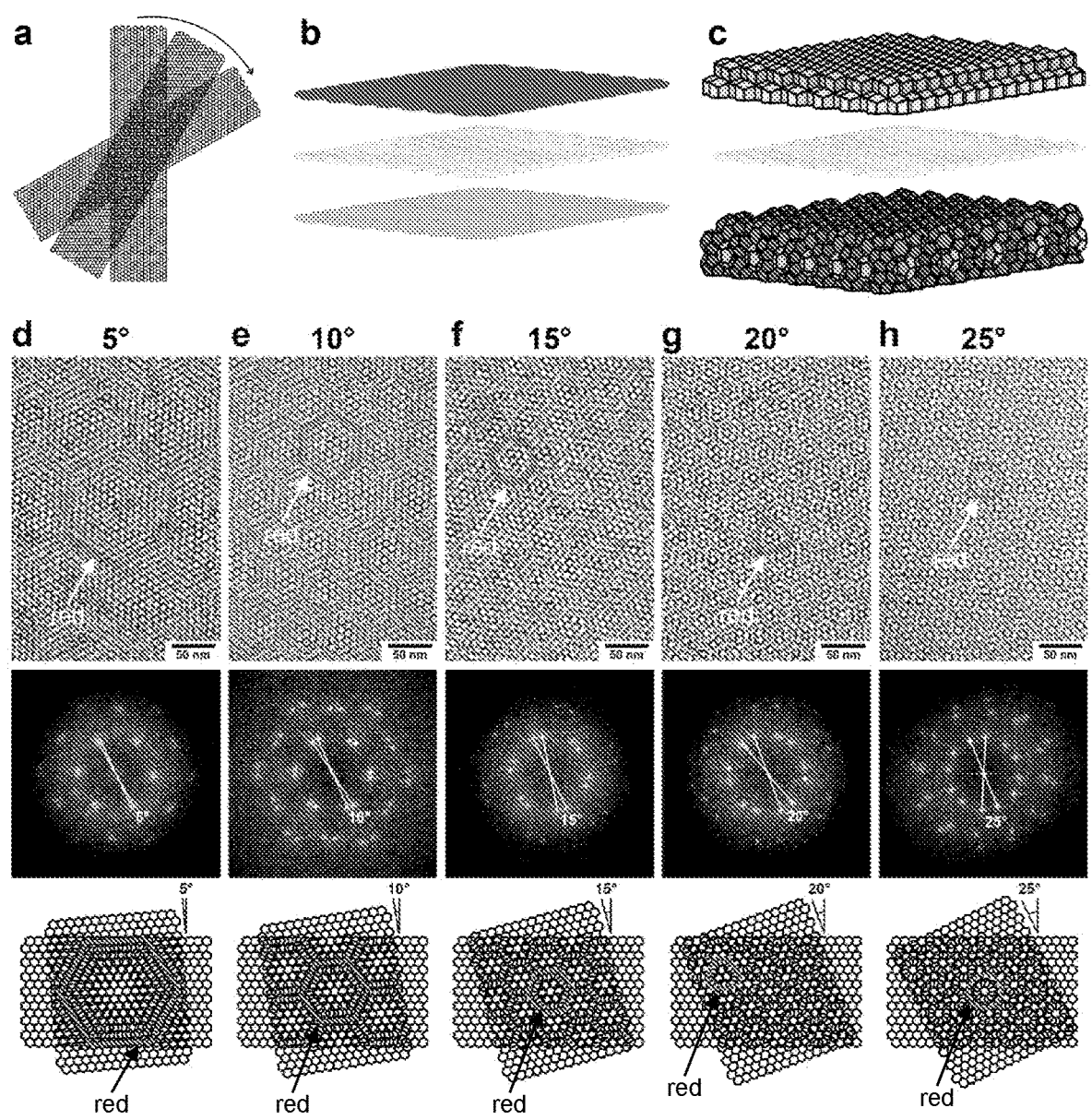

FIG. 4 shows heterostacks based on silica cage superlattices. (a-c) Illustration of superlattice heterostack designs by tuning the angle between layers (a), their chemical composition (b), and structure (c). (d-h) Moiré patterns resulting from two monolayer cage superlattices stacking at different angles. TEM images (top), corresponding FFTs (middle), and simulated projections (bottom) of two superlattices at angles of 5° (d), 10° (e), 15° (f), 20° (g), and 25° (h). In both the TEM images and simulated projections easily identifiable motifs of the Moiré patterns are highlighted in red.

Figure 5:
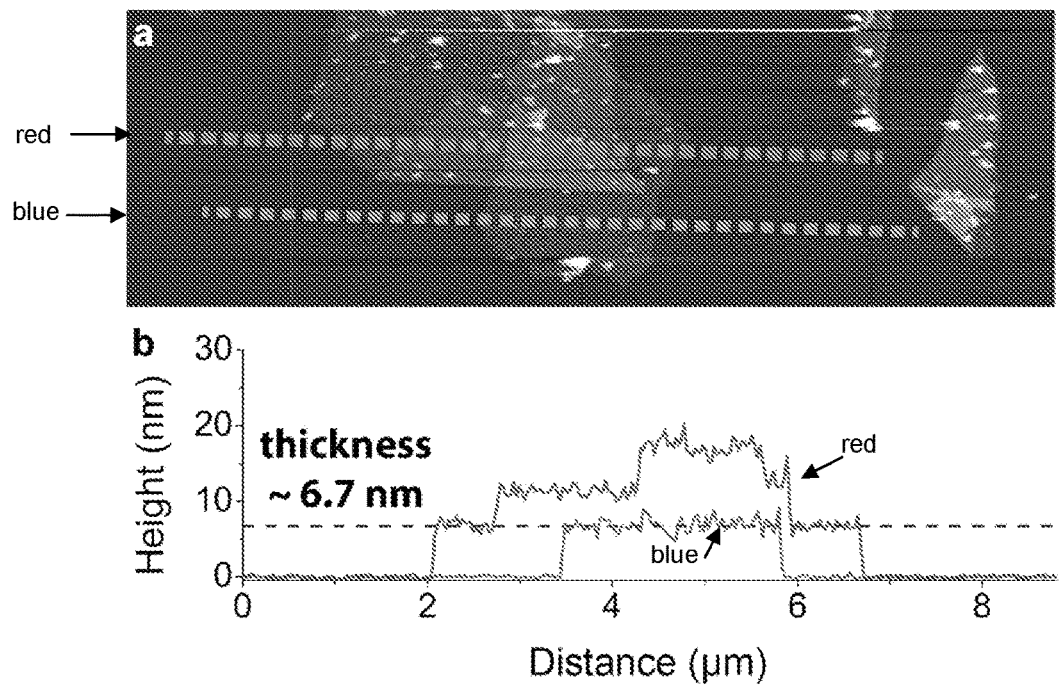

FIG. 5 shows examples of AFM analysis. AFM image (a) and line profiles (b) across a single layer of the superlattice (blue) or stackings of multiple monolayer superlattices (red).

Figure 6:
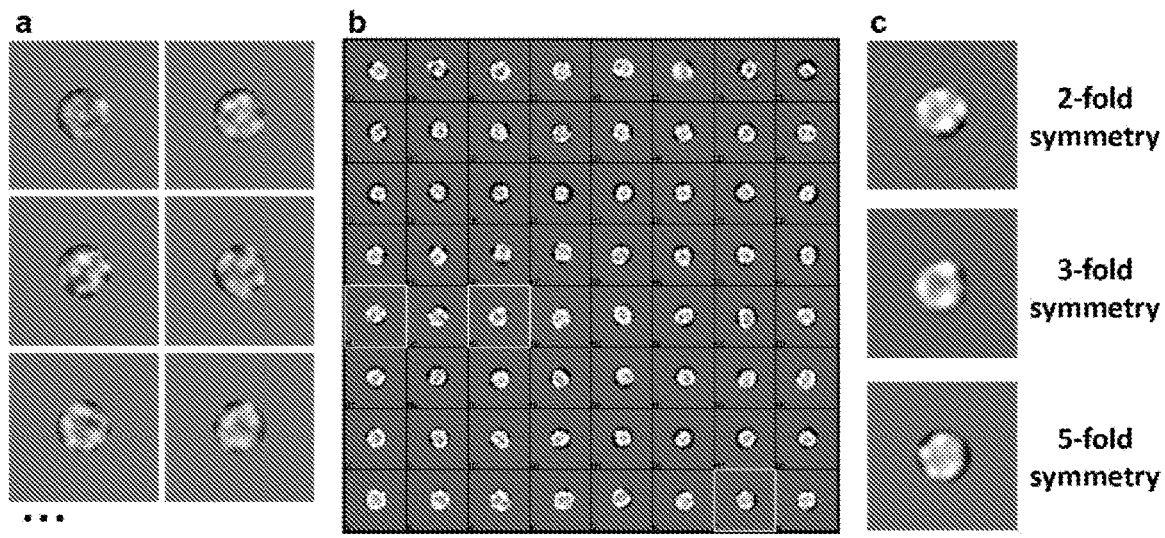

FIG. 6 shows analysis of cage-like pores by EMAN2 software. In order to reveal the strut patterns within the pores of monolayer silica cage-like superlattice, about 1800 pore images were individually cut from TEM images and properly masked in order to highlight only the internal structure. Six of those are shown in (a). Using EMAN2 software, these 'single-particle' images were classified and sorted into 64 clusters based on their similarities, then aligned and finally averaged per cluster (b). Some of these averaged clusters exhibit patterns with 2-, 3- and 5-fold symmetries (c). The specific clusters shown in c, are the averages of 18, 29, and 87 pore images for the 2-, 3- and 5-fold symmetries, respectively.

Figure 1:
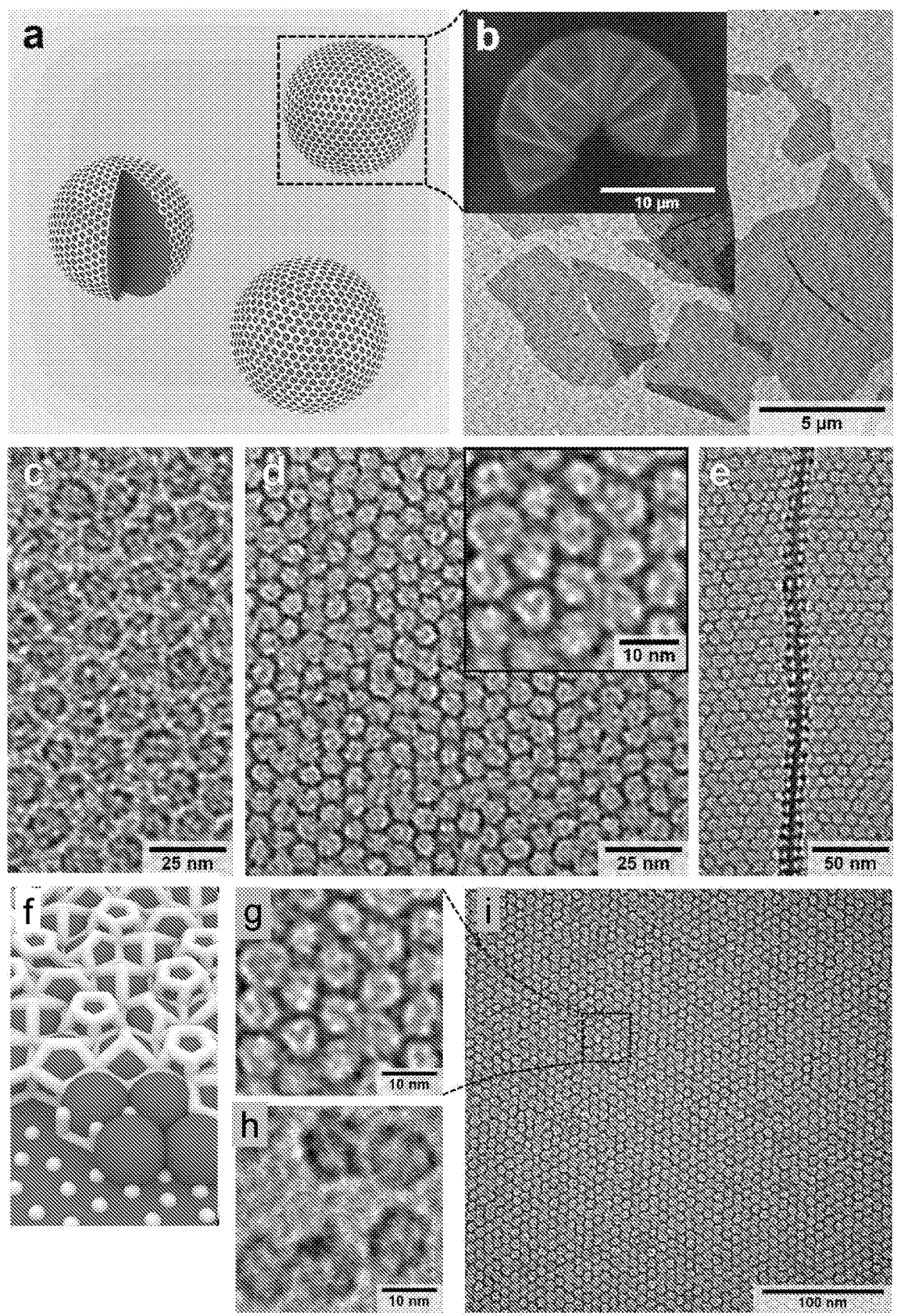
FIG. 1 shows an illustration and TEM images of silica cage superlattices having a single monolayer of silica nanocages. (a) and (f) Illustrations of silica superlattice formation at the surface of large oil droplets. (b) Low magnification TEM image of as prepared silica superlattice showing folds only in larger (>5 μm) pieces (inset: fluorescence microscopy image of a partially preserved fluorescently stained silica layer grown around a vesicle). (c-d) High magnification TEM images of isolated silica cages (c) and a silica cage superlattice with well-ordered honeycomb structure ((d) inset: zoom-in on the cage structures within the superlattice). (e) TEM image of a fold in a monolayer superlattice providing a double lateral view of the superlattice. (g-h) High magnification TEM images of a silica cage superlattice (g) as compared to isolated silica cages (h). (i)
Figure 7:
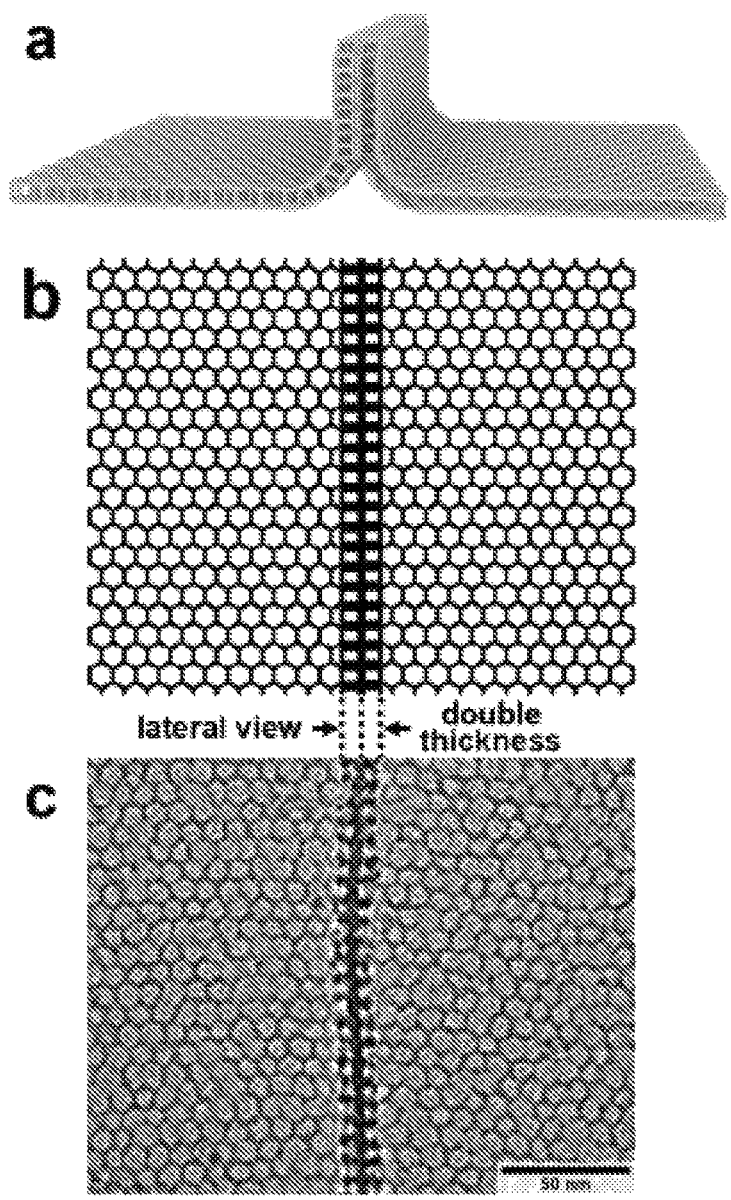

FIG. 7 shows an illustration and TEM image of a top view of a fold. Illustration (a), simulated projection (b) and TEM image (c) of a vertical fold in a monolayer superlattice, providing a lateral view of twice the superlattice thickness. The overlay of multiple struts in the fold generates a higher contrast (b and c). The presence and density of such folds in superlattices deposited on TEM grids by drop casting and blotting, depended on the dimensions of the superlattice pieces. While pieces of only a couple of micrometers in size may be free of folds, larger pieces typically showed 1 or 2 folds (see FIG. 1b in the main text for a representative low magnification TEM image of several superlattices).

Figure 8:
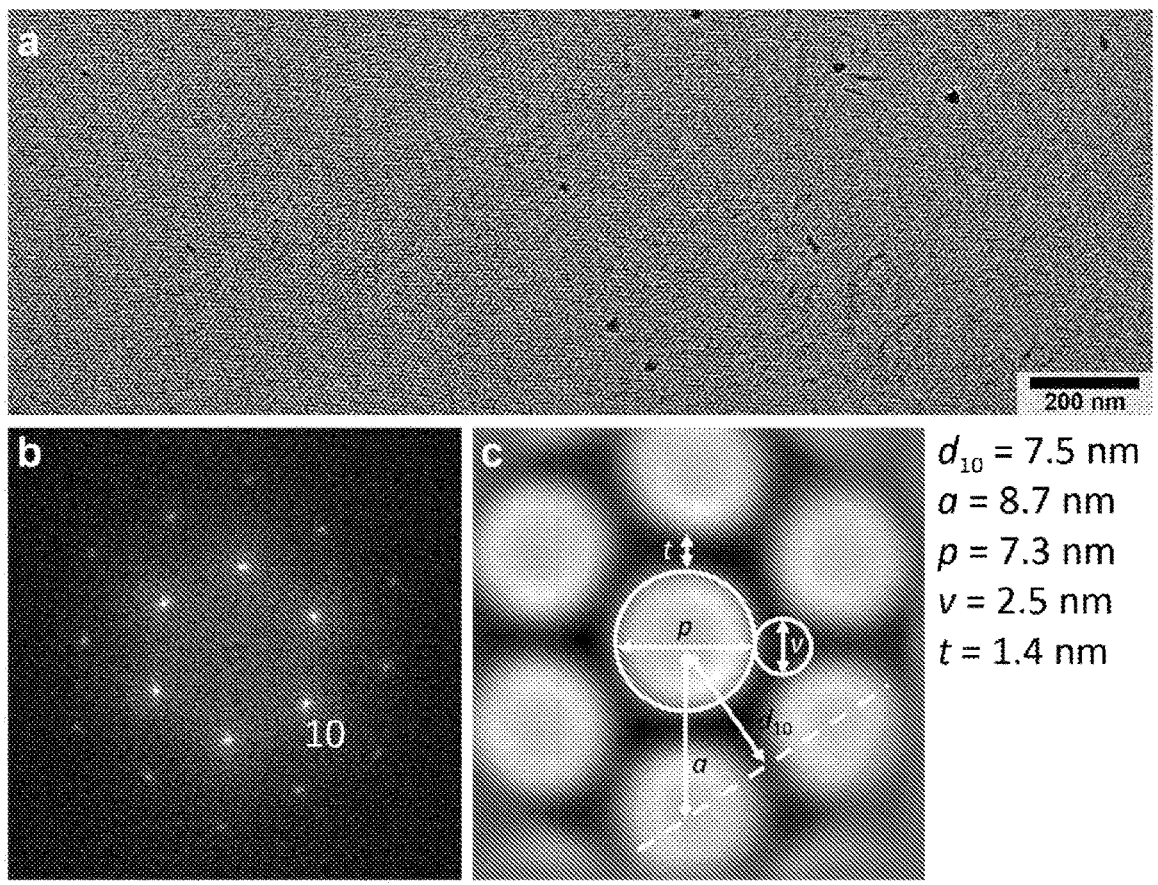

FIG. 8 shows long range 2D hexagonal order and detailed analysis of the dimensions of a superlattice. (a) Low magnification TEM image of a monolayer silica cage-like superlattice derived from cyclohexane as oil phase across roughly 2 µm (left to right). (b) Resulting image after applying a FFT to the whole area of the TEM image in (a). The image in (b) shows clearly 2D hexagonal feature with p6mm symmetry and the spot corresponding to the 10 lattice position is indicated. Therefore the superlattice region in (a) is a single domain with hexagonal arrangement of the pores. (c) Over 300 TEM images of unmasked boxes centered on single cages, aligned and averaged with EMAN2 software. In this case, because the pores were not individually masked, the image alignment is based solely on the 2D hexagonal pattern, and therefore, the features of the internal pore structures are randomly averaged and vanish. The FFT allows to determine the interplanar spacing, $d_{10}$, which in turn allows to calculate the lattice parameter, a. With this input, the averaged TEM image (c) enables to accurately determine the mean pore size, p, and vertex diameter, v, of the honeycomb structure. The thickness of the honeycomb struts, t, is then calculated from a and p. Resulting values for these parameters are shown in the upper right corner. For comparison, separately synthesized dodecahedral cages have very similar internal diameter, p, of 7.4 nm, and vertex diameter, v, of 2.4 nm.

Figure 9:
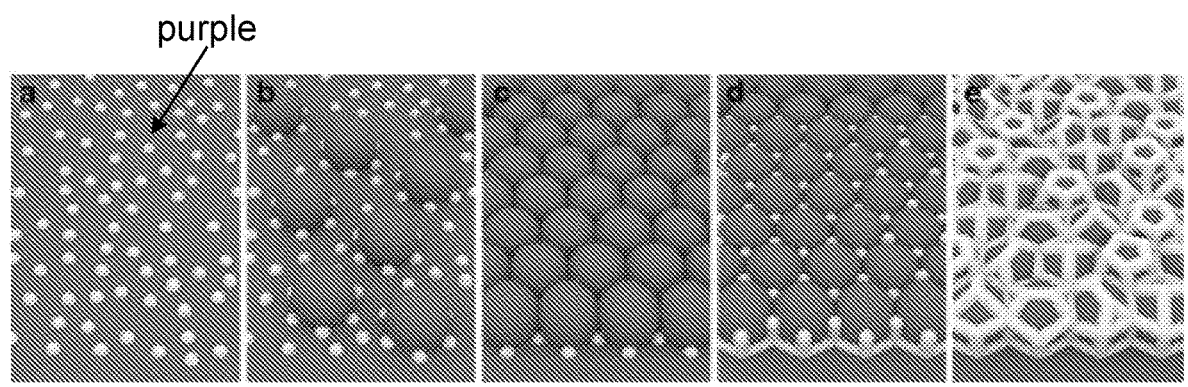

FIG. 9 shows an example of a superlattice formation mechanism. Illustration of superlattice formation mechanism. (a) Negatively charged primary silica clusters (white) adsorb at the water/oil interface, attracted by positively charged CTAB surfactant head groups (purple) and anchored in the surfactant layer by inserting unprotonated aminopropyl-groups (not shown). (b) As a result of the associated surface charge inversion, these silica clusters in turn attract surfactant micelles to the interface. (c-e) Under monolayer synthesis conditions, these micelles at the interface eventually adopt 2D hexagonal long range order enclosed in silica cages (c). Interestingly, results suggest that in such monolayer assemblies, no orientational order exists between individual cages, as illustrated in (e). While the sequence of panels c-e suggests 2D hexagonal micelle assembly predates silica cage formation, hexagonal micelle assembly and silica cage formation likely are more synergistic.

Figure 10:
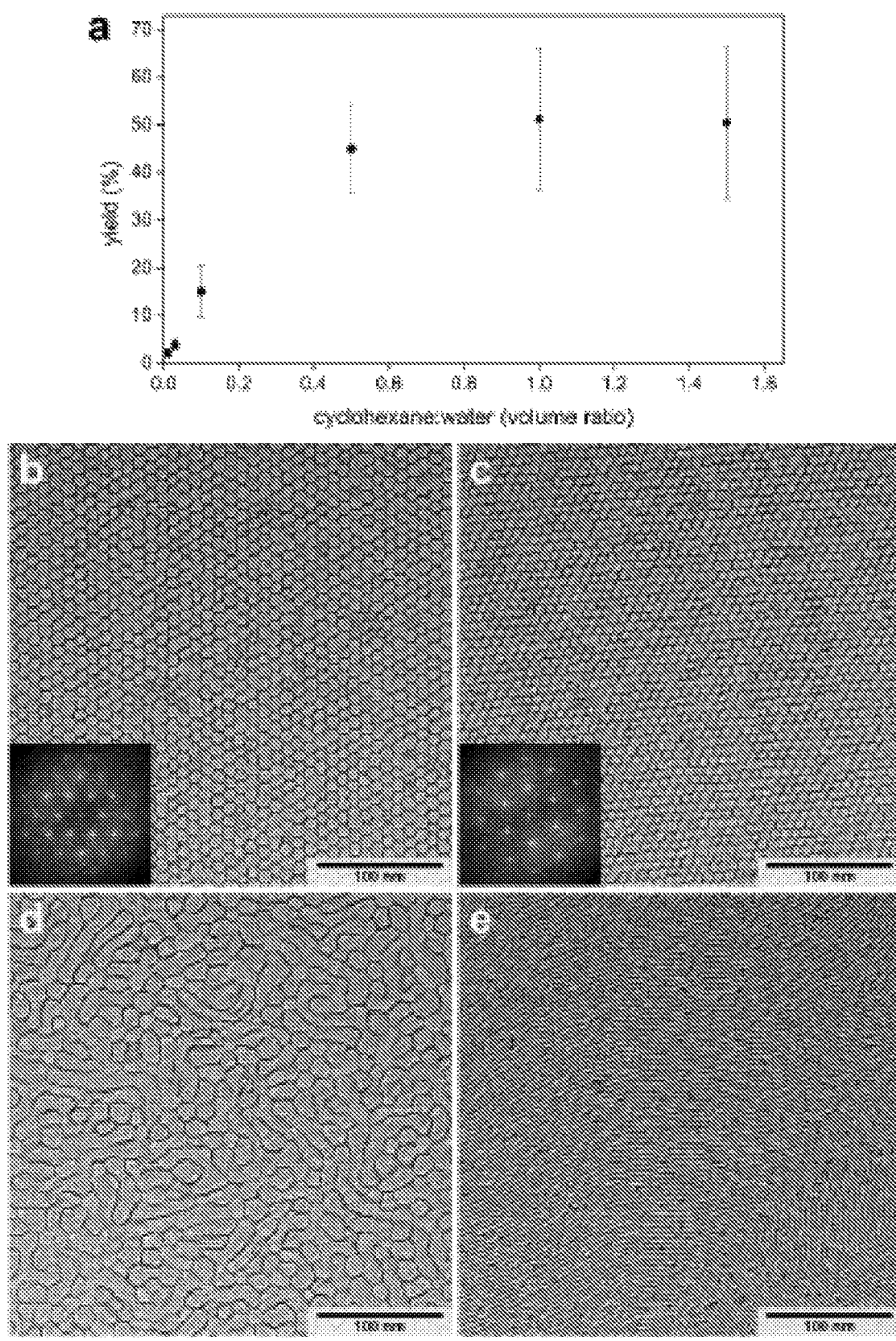

FIG. 10 shows an example of an effect of an oil phase. (a) Synthesis yield for silica superlattice formation as a function of oil:water volume ratio (at fixed volume of water), which is calculated from the weight of dried material collected at the water/oil interface and subsequently washed for surfactant removal, as compared to the theoretical value calculated from the amount of silica precursor used in the synthesis. These data were obtained using mesitylene as the oil phase and a mixture of 23 µl TMOS and 17 µl APTMS. All the other synthesis parameters were identical to those described in the experimental section for monolayer superlattice formation. Values are displayed as the mean of three independent syntheses with error bars representing the standard deviation. (b-e) TEM images of monolayer superlattices synthesized with mesitylene (a), hexane (b), styrene (c), and chloroform (d) instead of cyclohexane as the oil (insets in (a) and (b): resulting images obtained after applying a FFT to the whole area of the corresponding TEM images). Using mesitylene or hexane as the oil phase resulted in superlattices with 2D hexagonal structure, but with slightly different lattice parameters (10.5 nm and 8.2 nm for mesitylene and hexane, respectively, as compared to 8.7 nm for cyclohexane, see FIG. 8). In contrast, using styrene (c) or chloroform (d) as the oil phase resulted in silica layers with disordered or striped pore patterns, respectively, which are likely due to the self-assembly of cylindrical micelles with different aspect ratios at the liquid-liquid interface.

Figure 11:
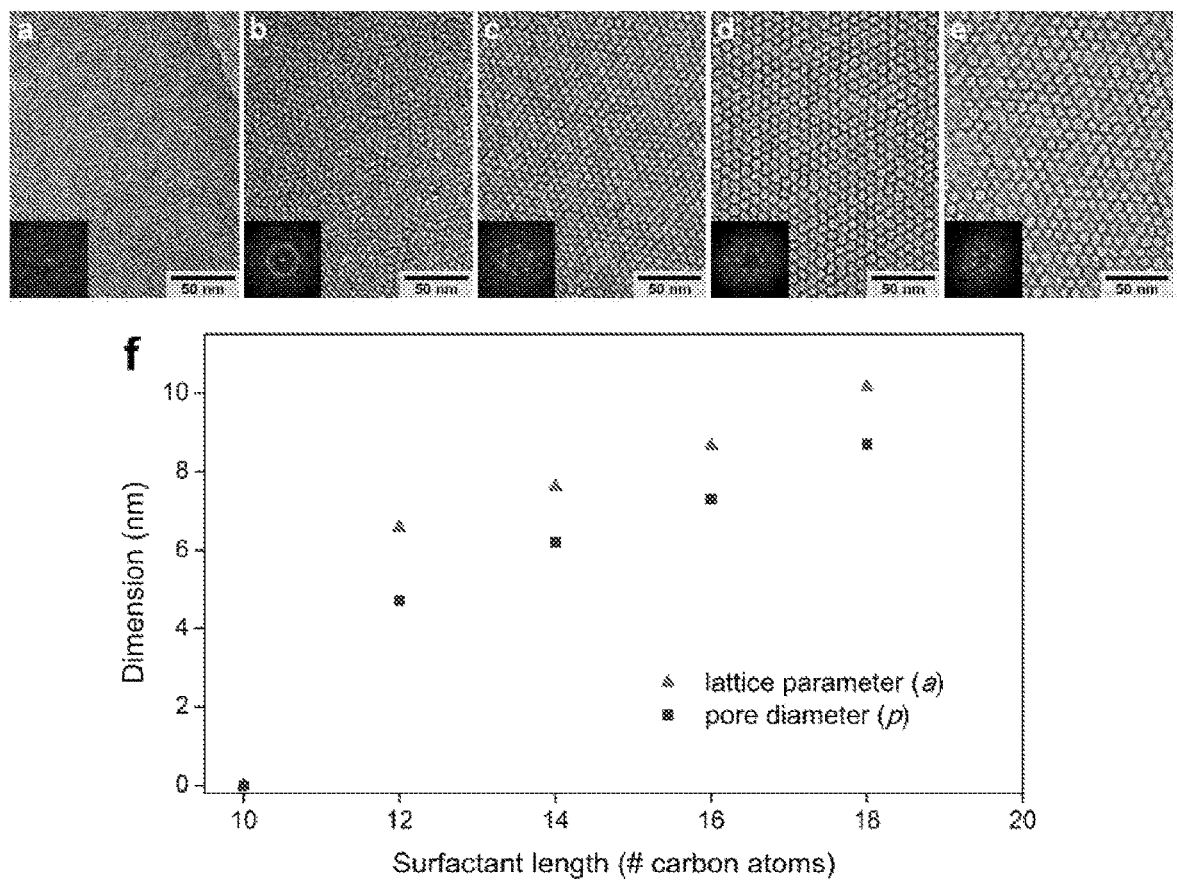

FIG. 11 shows an example of an effect of a surfactant. TEM images of thin silica layers or monolayer superlattices synthesized with equimolar amounts of $C_{10}TAB$ (a), $C_{12}TAB$ (b), $C_{14}TAB$ (c), $C_{16}TAB$ (d), and $C_{18}TAB$ (e). The insets in the TEM images (a-e) show the results of applying FFT analysis to the entire area of the corresponding TEM images. (f) FFT derived lattice parameter and pore diameter as a function of surfactant length. Samples synthesized with $C_{10}TAB$ (a) or $C_8TAB$ (not shown) did not show any pores in the silica layers formed. For $C_{12}TAB$ (b) the porous structures did not show long-range order whereas for longer surfactants (c-e) the monolayer superlattices all showed long-range 2D hexagonal order. Corresponding lattice parameters and pore diameters increased approximately linearly with surfactant length over the range studied (f). Finally, the difference between lattice parameter and pore diameter stayed virtually constant from $C_{12}TAB$ to $C_{18}TAB$ suggesting that the thickness of the silica honeycomb struts did not significantly vary with surfactant length over the range studied.

Figure 12:
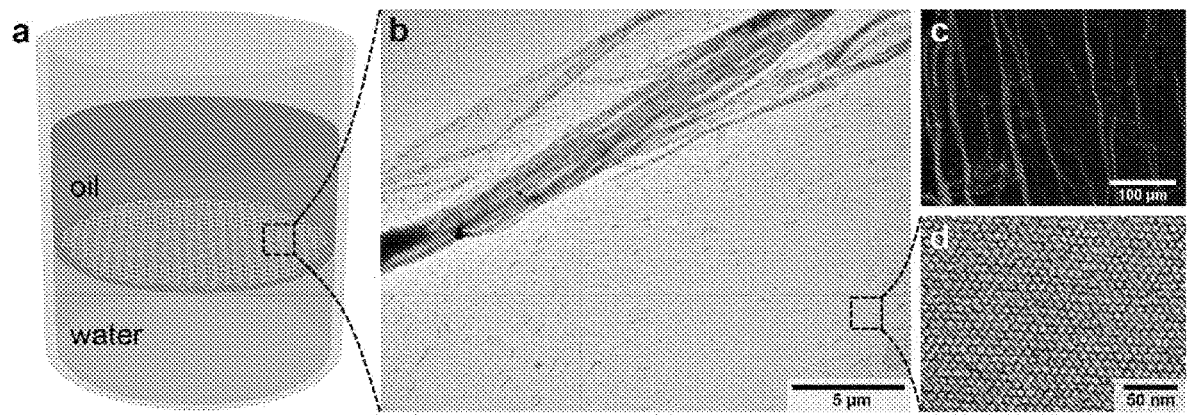

FIG. 12 shows an example of a macroscopic superlattice synthesis. (a) Illustration of a superlattice grown at a flat water/oil interface. Low magnification TEM (b) and fluorescence microscopy (c) images of macroscopic superlattices derived from the set up shown in (a). (d) Higher magnification TEM image demonstrating that the 2D hexagonal symmetry of the monolayer superlattice is maintained under these synthesis conditions.

Figure 13:
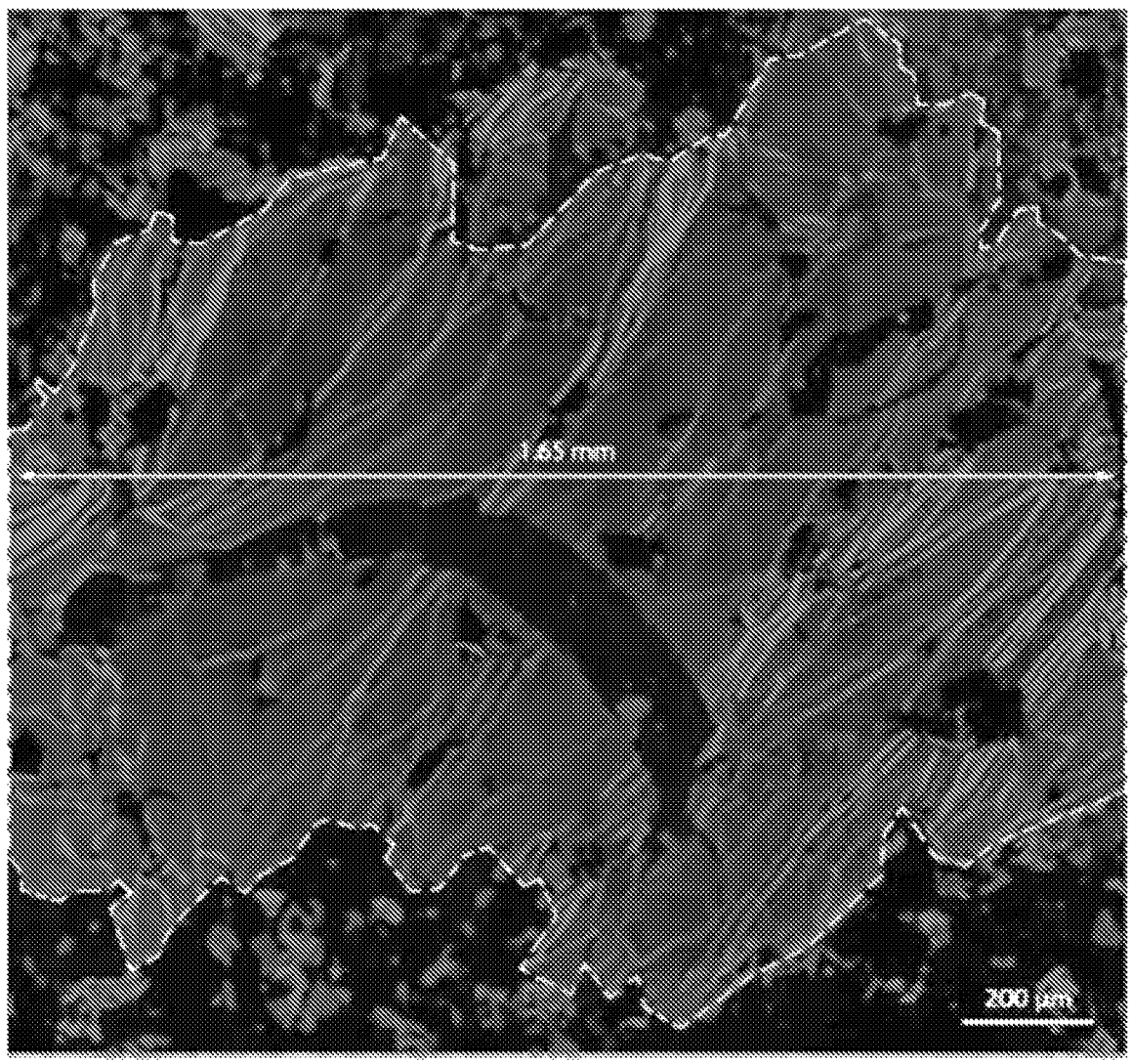

FIG. 13 shows an image of a macroscopic superlattice. Low magnification fluorescence microscopy image of a macroscopic superlattice synthesized at a flat water/oil interface. Cracks and wrinkles likely are from the transfer process from solution to a solid glass substrate for imaging.

Figure 14:
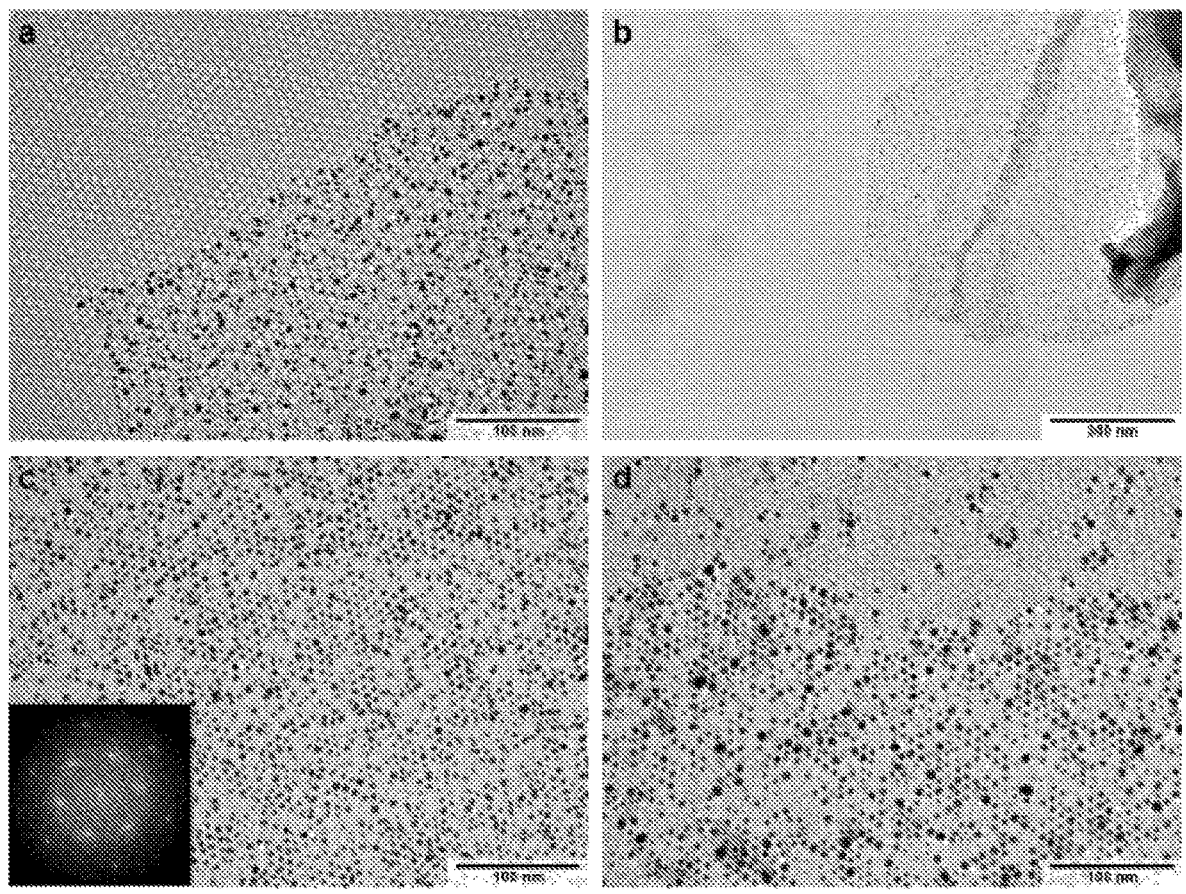

FIG. 14 shows an example of superlattice functionalization with gold nanoparticles. (a-b), TEM images at different magnifications of two superlattices partially overlapping each other. The samples were first dried on carbon coated TEM grids, then immersed in a citrate-stabilized gold nanoparticle solution for one hour, then briefly washed in water and ethanol, and subsequently dried in air. In each figure, only one of the superlattices is covered with gold nanoparticles, suggesting that the amine groups are only present on one side of the superlattices. When the superlattice sits and dries with the amine functionalized side facing down onto the carbon film of the TEM grid, amine groups are not accessible for gold nanoparticle attachment. In contrast, the parts of a superlattice with the amine groups pointing upward can bind to gold and are then covered with nanoparticles. (c-d) TEM images of superlattices exposed to mercaptoundecanoic acid-(MUA-)stabilized gold nanoparticle solution. The inset in (c) exhibits results of FFT analysis of the whole area of the TEM image shown in (c) and suggests an interplanar spacing, $d_{10}$, of 7.5 nm, identical to that of the underlying silica superlattice (see FIG. 8 for details). In (a) the piece of superlattice which is covered with gold nanoparticles appears partially dissolved resulting in loss of the 2D hexagonal symmetry, and the gold nanoparticles do not show ordered attachment. This is most likely due to the release of deprotonated citrate molecules upon binding of amine groups with the gold surface, resulting in a local increase of the pH in turn responsible for the loss of silica. In order to prevent this effect, citrate ligands were exchanged with MUA, and a drop of MUA-stabilized gold nanoparticles was then added to a TEM grid with deposited superlattices. Under these conditions, as evidenced in (c), the structure of the underlying silica superlattice was better preserved and when the gold nanoparticles attached, they at least partially adopted the 2D hexagonal symmetry of the underlying silica template. In (d), two superlattices are overlapping each other similar to those in a. In this case, the superlattice with the amine groups facing the carbon support (upper part of the image) still show a few gold nanoparticles rather than no gold as in (a). This is likely due to the drying of the whole drop of MUA-stabilized gold nanoparticles in this approach (instead of immersing the film followed by a washing step, as in the case leading to panels (a) and (b)). These few nanoparticles appear to have fallen randomly on this piece of superlattice. This results in a lower particle density as compared to the superlattice with the amine groups facing up (lower part of the image) preventing the formation of any discernable particle ordering.

Figure 15:
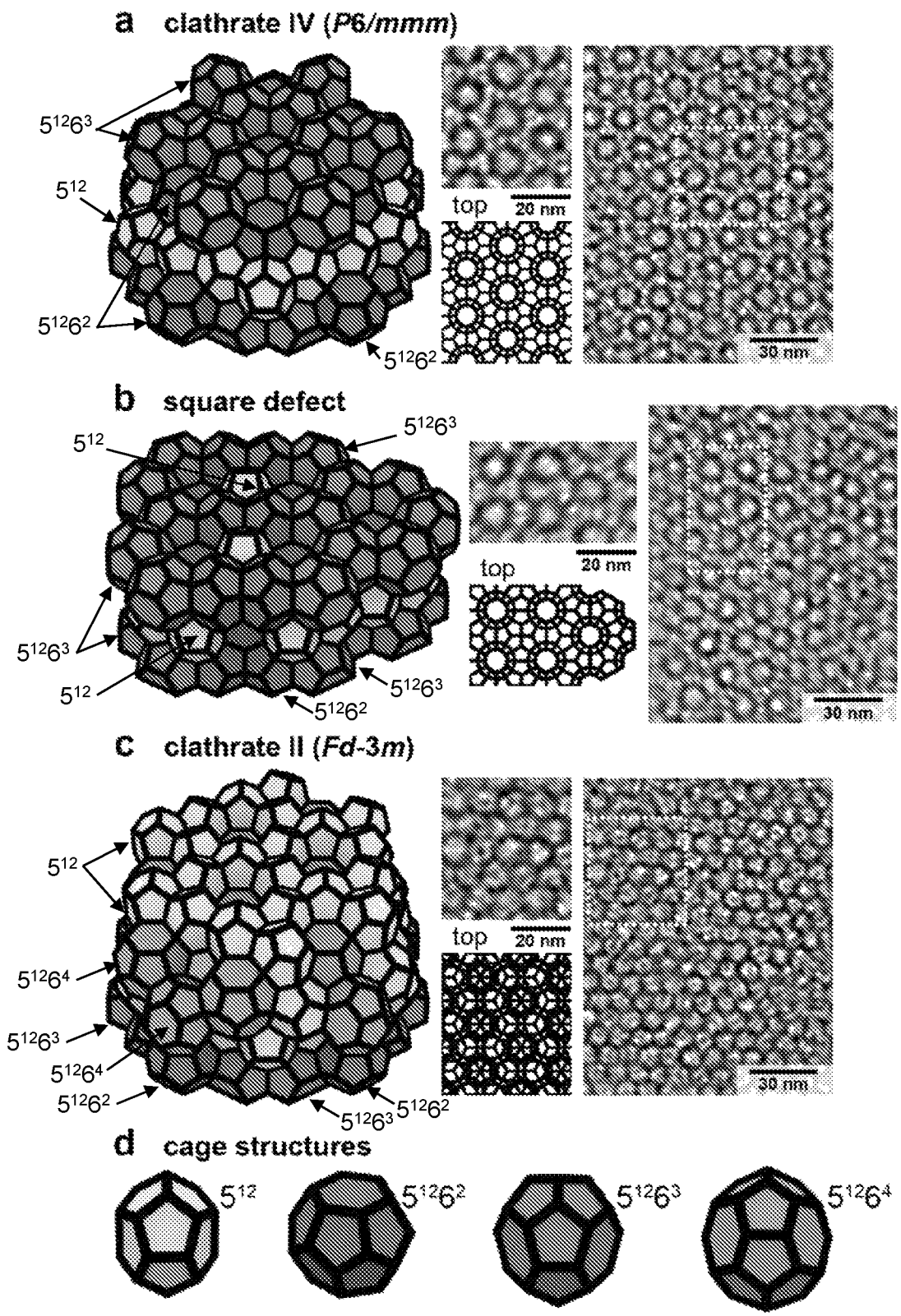

FIG. 15 shows additional characterization of multilayer superlattices. (a-c) Illustration, TEM images, and simulated top projections of multilayer superlattices with clathrate IV structure (a), square defects (b), and clathrate II structure on top of a clathrate IV base (c). The clathrate II structure was observed in superlattices synthesized with the same $C_{16}TAB/C_8TAB$ mixture as for the multilayer superlattices with a clathrate IV structure, except that the amount of ammonium hydroxide addition was increased by a factor 1.8 as compared to the monolayer synthesis. (d) Illustration of the different cage motifs involved in these superlattices.

Figure 16:
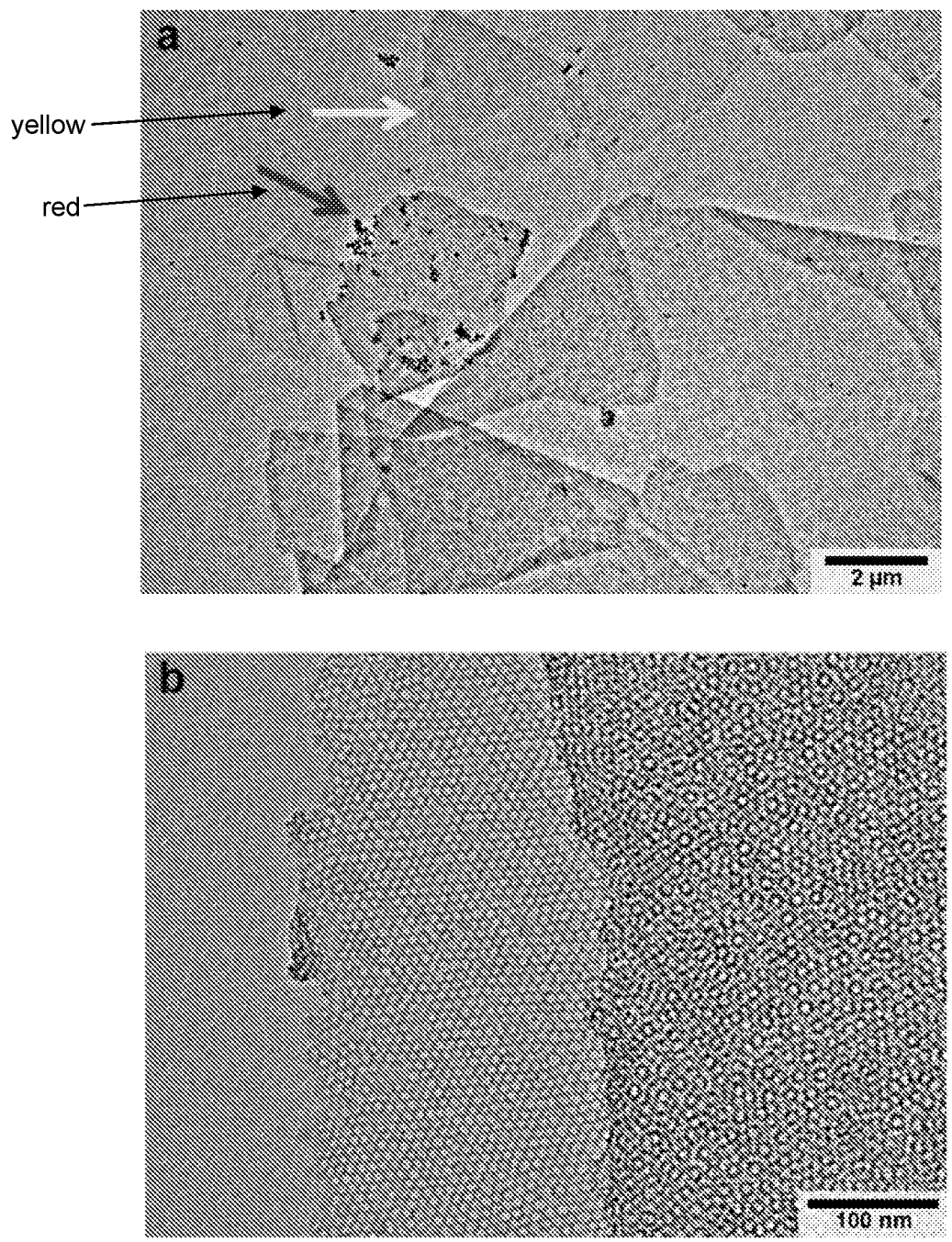

FIG. 16 shows superlattice heterostacks. (a) Low magnification TEM image where monolayer superlattices and multilayer superlattices can be distinguished from their different contrast (yellow and red arrows point to examples of single and multilayer superlattices, respectively). (b) Higher magnification TEM image of a heterostack from a multilayer superlattice on top of a monolayer superlattice.

Figure 17:
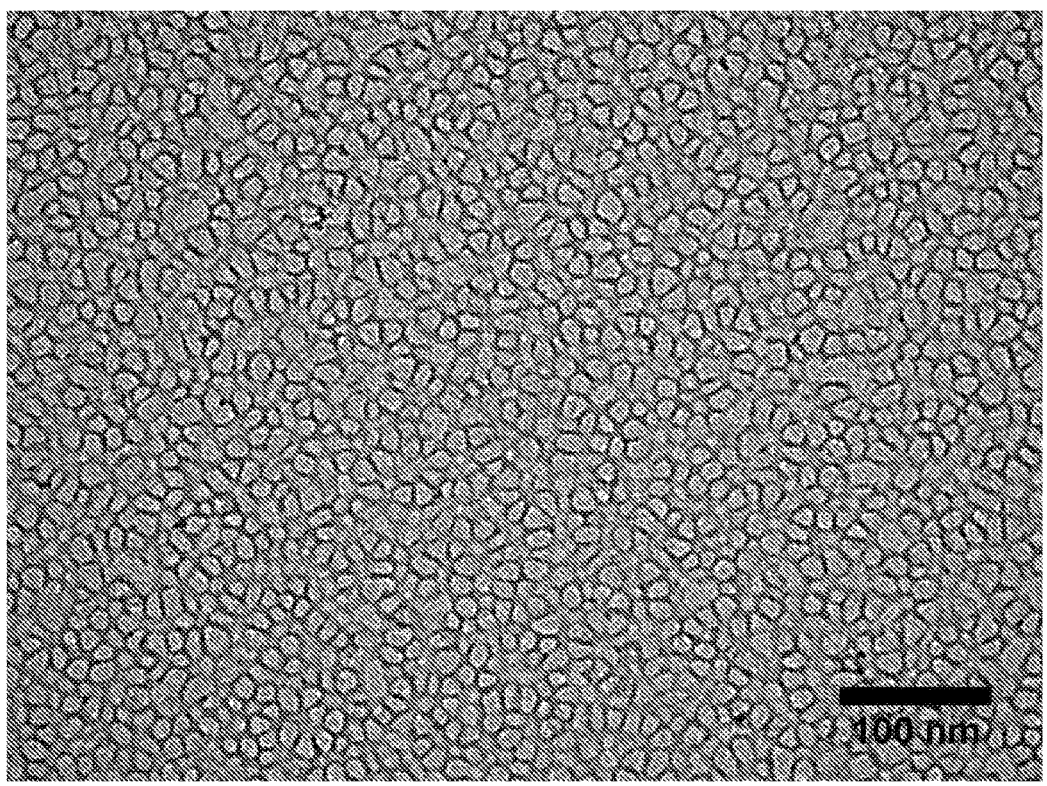

FIG. 17 shows TEM images of porous silica nanosheets synthesized from a mixture of $C_{16}TAB$ and BrijL4 as surfactants.

Figure 18:
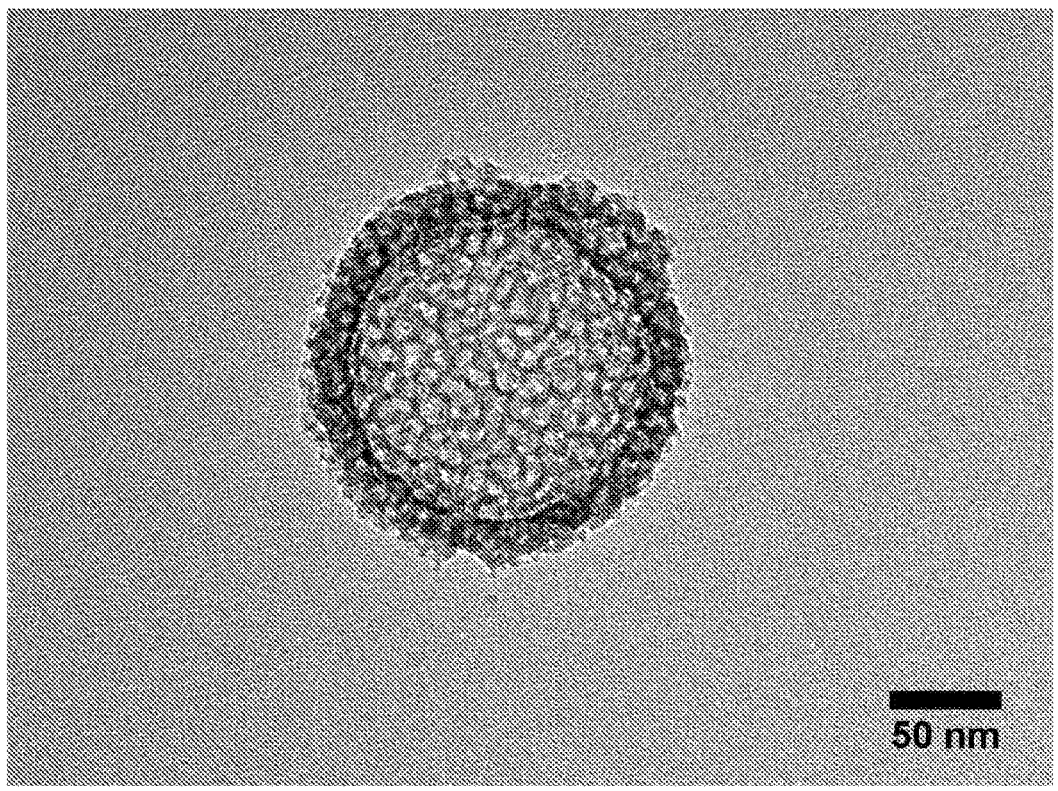

FIG. 18 shows porous sphere-like structure (hollow sphere with porous wall) synthesized using $C_{16}TAB$:BrijL4 mixture of surfactants.

Figure 19:
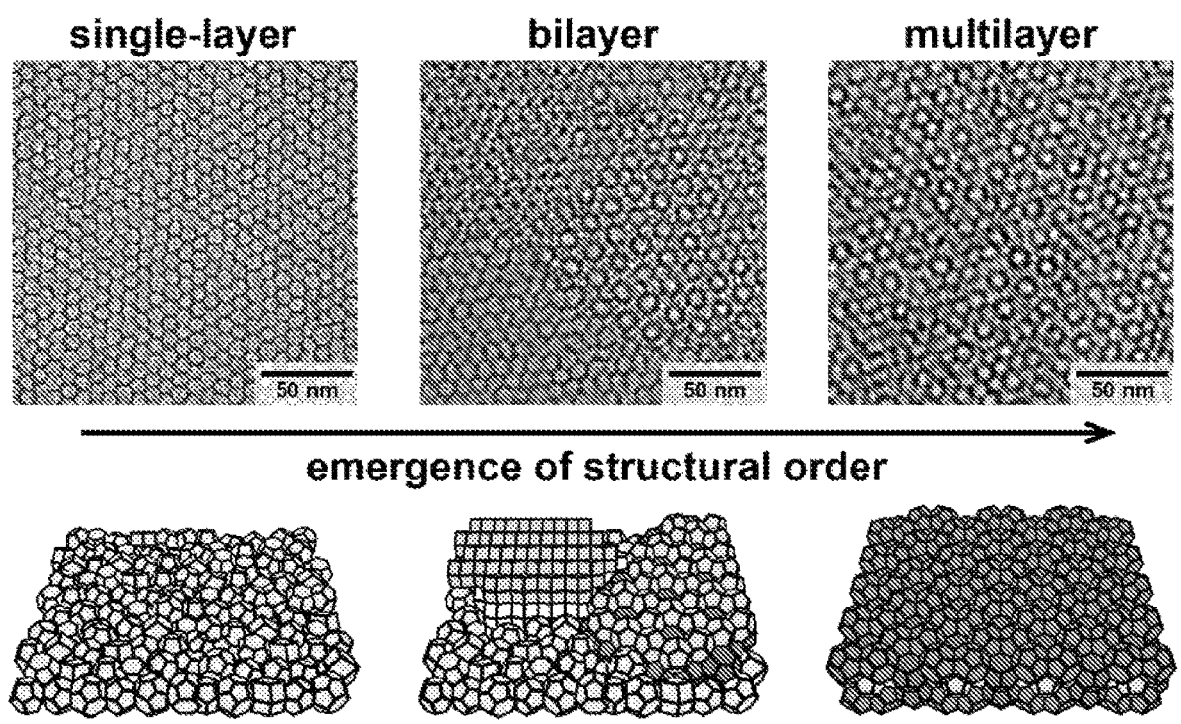

FIG. 19 shows sequence of order achieved moving from monolayer (left), across a bilayer (middle) to the multilayer (right) of compositions.

DETAILED DESCRIPTION OF THE DISCLOSURE

Although subject matter of the present disclosure is described in terms of certain embodiments and examples, other embodiments and examples, including embodiments and examples that do not provide all of the benefits and features set forth herein, are also within the scope of this disclosure. For example, various structural, logical, and process step changes may be made without departing from the scope of the disclosure.

Ranges of values are disclosed herein. The ranges set out a lower limit value and an upper limit value. Unless otherwise stated, the ranges include all values to the magnitude of the smallest value (either lower limit value or upper limit value) and ranges between the values of the stated range.

As used herein, unless otherwise stated, the term "porous" refers to compositions having mesopores (e.g., formed by the inorganic material or intrinsic to the inorganic material)

and, optionally, micropores (e.g., intrinsic to the inorganic material), as defined by The International Union of Pure and Applied Chemistry (IUPAC).

As used herein, unless otherwise indicated, the term "group" refers to a chemical entity that is monovalent (i.e., has one terminus that can be covalently bonded to other chemical species), divalent, or polyvalent (i.e., has two or more termini that can be covalently bonded to other chemical species). The term "group" also includes radicals (e.g., monovalent and multivalent, such as, for example, divalent radicals, trivalent radicals, and the like). Examples of groups include, but are not limited to:

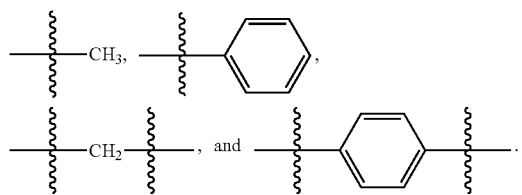

The present disclosure provides compositions. Also provided are methods of making and uses of the compositions.

In an aspect, the present disclosure provides compositions. A composition may be a superlattice or a superstructure. A superstructure may be a periodic structure, which may be formed from inorganic nanocages as building blocks. As the inorganic nanocages may be made from amorphous (e.g., silica, aluminosilicate, or the like) or crystalline (e.g., metals, metal oxides, or the like) materials, with the latter having an atomic lattice, a periodic structure may be referred to as a superlattice. A composition is porous. A composition may be a porous superlattice comprising porous inorganic material (e.g., one or more individual layers of a 2D inorganic material, which may be a 2D inorganic mesoporous material). The inorganic mesoporous material may also be microporous. A composition may be a membrane. Non-limiting examples of compositions are provided herein (e.g., in the Examples, Statements, and claims). In an example, a composition is made by a method of the present disclosure.

In various examples, a composition comprises one or more individual layer(s) of a porous inorganic material. The individual layers of porous inorganic material may each comprise 1 to 100 monolayers of porous inorganic nanocages, which may be mesoporous inorganic nanocages.

A composition, which may be referred to as a porous superlattice, may comprise mesopores (e.g., pore sizes between 2 and 50 nm, including all 0.1 nm values and ranges therebetween) and, optionally, micropores (e.g., pore sizes below 2 nm). As an illustrative example, a silica nanocage may exhibit mesoporosity. Pore size means the pores have at least one dimension (which may be the longest dimension of a pore (e.g., a dimension of the aperture of the pore)).

A porous inorganic material, which may comprise an inorganic mesoporous material, may comprise mesopores (e.g., pores formed by interstitial space between two or more inorganic nanocages and/or the pore(s) of the individual inorganic nanocages) and, optionally, micropores (e.g., pores within the volume of the material of one or more or all of the inorganic nanocages).

A composition may have various pore size distributions. In various examples, the pore size distribution of the composition, which may be a membrane, is narrow (e.g., 90%, 95%, 99%, or 99.9% or 100% of the pores have a size ±10% of average pore size). In an example, 90% of the pores of the one or more individual layer(s) of the porous inorganic material have a size that is ±10% of average pore size of the pores of the one or more individual layer(s) of the porous inorganic material.

A composition can have various forms. In various examples, a composition is a monolith, a free-standing membrane, or the like.

A composition may comprise inorganic nanocages. The inorganic nanocages may have a disordered structure or at least a partially periodic structure.

A composition may comprise one or more individual layer(s). An individual layer of porous inorganic material, which may comprise inorganic nanocages, may be referred to as a nanosheet.

An individual layer may have two or more domains and at least two of the domains are different in terms of composition (e.g., nominal composition).

All or at least a portion of the inorganic nanocages in an individual layer may be oriented with regard to each other. All or at least a portion of the inorganic nanocages in an individual layer may not be oriented with regard to each other.

A composition may comprise one or more individual layers exhibiting a 2D hexagonal structure, cubic close packed structure (i.e., space group Fm-3m), hexagonal close packed structure (i.e., space group P63/mmc), clathrate IV structure (i.e., space group P6/mmm), clathrate I structure (i.e., space group Pm-3n), clathrate II structure (i.e., space group Fd-3m), or the like.

The individual layers of the porous inorganic material and/or the mesoporous inorganic material(s) may be the same. In various examples, one or more or all of the layers of the porous inorganic material (and/or one or more or all of the mesoporous inorganic material) are the same in terms of one or more or all of structure (e.g., individual inorganic nanocage structure, thickness (e.g., number of monolayers), and the like, and combinations thereof), composition, orientation, or the like, or any combination thereof.

The individual layers of the porous inorganic material may be different than one or more or all of the other individual layers and/or one or more or all of the mesoporous inorganic material(s) may be different than one or more or all of the other mesoporous inorganic material(s). In various examples, one or more or all of the individual layers of the mesoporous inorganic material are different from one or more or all of the other individual layers and/or one or more or all of the mesoporous inorganic material(s) are different than one or more or all of the other mesoporous inorganic material(s) in terms of one or more or all of structure (e.g., inorganic nanocages, thickness (e.g., number of monolayers), and the like, and combinations thereof), composition, orientation, or the like, or any combination thereof.

The individual layers of a composition can have various thicknesses (e.g., number of monolayers). In the case of individual layers of the porous inorganic material (e.g., mesoporous inorganic material) comprising only one monolayer mesoporous inorganic nanocages, the individual layer(s) may independently have a thickness of 1 to 15 nm, including all 0.1 nm values and ranges therebetween. In various other examples, the individual layers of the porous inorganic material (e.g., mesoporous inorganic material have a thickness of 5 to 15 nm (e.g., comprise monolayers of silica cages, aluminosilicate cages, transition metal oxide cages, metal cages, or the like, or a combination thereof). In the case of individual layers comprising multiple monolayers, the individual layers of the porous inorganic material (e.g., mesoporous inorganic material) may have a thickness of 1 nm to 1 micron, including all 0.1 nm values and ranges therebetween, or 5 nm to 1 micron (e.g., comprise multiple monolayers of silica cages, aluminosilicate cages, transition metal oxide cages, metal cages, or a combination thereof). In various examples, the individual monolayers of inorganic nanocage have a thickness of 1 to 15 nm and/or, in the case of an individual layer or layers comprising multiple monolayers, the individual layers of the porous inorganic material have a thickness of 1 nm to 1 micron.

The individual layers of a composition can have various sizes. A size may be a length and/or a width. A size may be an area. In various examples, the individual layers of the porous inorganic material (e.g., mesoporous inorganic material, nanoporous material, or the like) have a size (e.g., length and/or width) of 10 nm to 1 meter, including all integer nm values and ranges therebetween, and/or an area of 100 $nm^2$ to 1 $m^2$, including all integer $nm^2$ values and ranges therebetween.

The individual layers of a composition can be various materials. In various examples, the individual layers of porous inorganic material (e.g., mesoporous inorganic material) are a layer of silica mesoporous material, aluminosilicate mesoporous material, transition metal oxide mesoporous material, metal mesoporous material, or the like, or a combination thereof.

An individual layer of a composition may be functionalized. In various examples, one or more of the individual layers of the inorganic mesoporous material have a metal (which may be a metal alloy), a metal oxide (e.g., a metal oxide comprising a plurality of different metal oxides), or a combination thereof disposed on at least a portion of or all of a surface (e.g., an interior (pore) surface, an exterior surface, or a combination thereof) of the inorganic mesoporous material. The metal and/or metal oxide may be in the form of a plurality of nanoparticles. E.g., the metal is a catalytically active metal, such as, for example, a Group 8, 9, 10, or 11 metal, or a combination thereof. In various examples, the individual layer(s) comprise (e.g., have) a metal (which may be a metal alloy), a metal oxide (e.g., a metal oxide comprising a mixture of metal oxides), or a combination thereof disposed thereon and form a discrete region of the composition (e.g., chemically bonded to at least a portion of a surface, which may be an exterior surface, of the composition and/or individual layer of the composition) and the composition comprises one or more such discrete regions.

The individual inorganic nanocages can comprise (or be) various inorganic materials. In various examples, the individual nanocages (e.g., the nanocage or nanocages of an individual layer of porous inorganic material) are silica nanocages, amorphous silica compositions (for example, amorphous silica compositions such as, for example, organically modified silica, aluminosilicates and the like), amorphous, semicrystalline, or fully crystalline transition metal oxides (for example, transition metal oxides such as, for example, titania, niobia, iron oxide, etc.), or metals (for example, metals such as, for example, gold, silver, etc.).

The porous structure of the composition may be disordered or ordered (e.g., highly ordered). In various examples, the porous structure of the composition is ordered and, for example, the composition has a hexagonal, lamellar, cubic close packed (ccp), hexagonal close packed (hcp), or quasicrystalline structure. 100531 A composition may further comprise a substrate. In various examples, the composition further comprises a substrate and at least a portion or all of an exterior surface of an exterior individual layer of the composition is disposed on at least a portion of or all of an exterior surface of the substrate. Non-limiting examples of substrates (or examples of materials of which a substrate is comprised) include porous polymeric materials (e.g., porous polymer materials and the like), dense substrates (e.g., glass, silicon (such as, for example, silicon wafers), aluminum, and the like), porous substrates (e.g. bulk mesoporous silica, porous ceramics, porous polymer materials, and the like), silicones (e.g., polydimethylsiloxane and the like), mesh substrates (e.g., metal mesh, polymer fiber mesh, carbon mesh, and the like), textiles (e.g., cotton fabric and the like), adhesive polymer layers, thermal release tapes, and the like.

A composition (e.g., the pores of the composition or the inorganic nanocages of the composition) may exhibit periodicity. In various examples, the composition exhibits periodicity in at least a portion of or all of the composition. The periodicity may be crystallographic registration of a portion of or all of the inorganic nanocages. The composition (e.g., compositions comprising 2 or more, 3 or more, or 4 or more 2D layers) may exhibit crystallographic registration (e.g., of the inorganic nanocages) (e.g., 90% or more, 95% or more 99% or more, or all of the inorganic nanocages exhibit crystallographic registration) and, optionally, individual inorganic nanocages (e.g., transition metal nanocages, transition metal oxide nanocages, metal nanocages, metal oxide nanocages, and combinations thereof), may be single crystalline or comprise one or more single-crystalline domains (e.g., one or more single-crystalline domains up to one square meter in area) or be polycrystalline. The periodicity may be mesoscopic order (e.g., a single mesoscopically ordered domain or multiple mesoscopically ordered domains, which may be determined by analytical methods known in the art, such as, for example, small angle x-ray scattering (SAXS) and, optionally, crystallinity (which may be atomic crystallinity) of a portion of or all of the inorganic nanocages, which may be determined by analytical methods known in the art, such as, for example, wide angle x-ray scattering (WAXS).

The inorganic mesoporous material may be an inorganic nanocage. An individual layer may comprise a plurality of inorganic nanocages. The inorganic nanocages of an individual layer may all have the same composition and/or structure or one or more of the inorganic nanocages may have different composition and/or structure. Suitable examples of inorganic mesoporous materials (e.g., inorganic nanocages) are known in the art. For example, examples of inorganic nanocages are described in International Patent Application No. PCT/US19/26411, filed Apr. 8, 2019, the disclosure of which with regard to inorganic nanocages is incorporated herein by reference.

The inorganic nanocages are discrete nanoscale structures. The inorganic nanocages may be referred to as nanoparticles, particles, cage-like structures, nanocages, or cages. The inorganic nanocages may have cage-like polyhedral shapes, which may have icosahedral symmetry. The inorganic nanocages comprise a plurality of polygons that form the inorganic nanocage. The polygons may all have the same shape or two or more of the polygons have different shapes. For example, the inorganic nanocages comprise the following surface polygons (where the exponent describes how often a polygon appears on the surface of the cage): $3^34^3$, $4^45^4$, $4^35^66^3$, $3^34^35^9$, $5^{12}$ (dodecahedral) $5^{12}6^2$, $4^66^8$, $5^{12}6^3$, $5^{12}6^4$, $4^35^96^27^3$, $5^{12}6^8$, $5^{12}6^{20}$ (buckyball) or the like.

In various examples, the inorganic nanocages (which may be porous, such as for example, mesoporous) are independently chosen from pentagonal dodecahedron porous inorganic nanocages (which may be referred to as $5^{12}$ porous inorganic nanocages and comprise 12 pentagonal faces), $5^{12}6^2$, $5^{12}6^3$, and $5^{12}6^4$ porous inorganic nanocages (where $5^n6^m$ refers to cages with n pentagonal and m hexagonal faces on their surface), rhombic dodecahedron, and trapezorhombic dodecahedron porous inorganic nanocages. The individual porous inorganic nanocages may be the same in an individual layer or one or more or all of the porous inorganic nanocages in a layer are different than the other porous inorganic nanocages.

The inorganic nanocages may comprise non-metal atoms in an oxidized state, metal atoms in an oxidized state (e.g., in the case of aluminosilicate nanocages), transition metal atoms in a neutral state or oxidized state, and combinations thereof. The inorganic nanocages may also comprise oxygen atoms. The inorganic nanocages may be non-metal oxide nanocages, metal nanocages, transition metal nanocages, metal oxide nanocages, and transition metal oxide nanocages. Non-limiting examples of non-metal oxide nanocages include silica nanocages, which may be referred to as silicages. A non-metal oxide nanocage may also include a metal oxide such as, for example, aluminum oxide (e.g., alumina). A non-limiting example of such non-metal oxide nanocages include aluminosilicate nanocages. Non-limiting examples of transition metal nanocages include gold nanocages, silver nanocages, platinum nanocages, palladium nanocages, rhodium nanocages, and the like. Non-limiting examples of transition metal oxide nanocages include vanadium oxide nanocages, titanium oxide nanocages, niobium oxide nanocages, copper oxide nanocages, nickel oxide nanocages, zirconium oxide nanocages, tantalum oxide nanocages, hafnium oxide nanocages, and the like. A transition metal nanocage may be a noble metal nanocage comprising a transition metal that is a noble metal.

The inorganic nanocages include, in various examples, a series of desirably-symmetric (e.g., highly-symmetric) cage structures at the nano-scale (instead of atomic scale structure in molecular cages). The inorganic nanocages may exhibit highly-symmetric cage structures, including, but not limited to, dodecahedral, icosahedral, cubic, hexagonal, tetrahedral, octahedral, buckyball-like cages, and the like.

Inorganic nanocages may have various sizes. The inorganic nanocages may have a size, e.g., a longest dimension, which may be a longest linear dimension (e.g., a diameter or the like), of 125 nm or less, 100 nm or less, or less than 30 nm. The inorganic nanocages may have a size, e.g., a longest dimension, which may be a longest linear dimension, which may be a diameter, of 1 nm to 125 nm, 5 nm to 125 nm, 5 nm to 100 nm, 5 to less than 30 nm, 5 to 20 nm, or 5 to 15 nm. For example, the inorganic nanocages may have a size, e.g., a longest dimension, which may be a longest linear dimension, which may be a diameter, of less than 5 nm to slightly more than 20 nm or slight more than 10 nm. The size may or may not include any surface functional groups of an inorganic nanocage.

The inorganic nanocages may have several structural features. These features may include an interior, a plurality of apertures (which may be referred to as "windows" or "open windows"), arms (which may be referred to as "struts" or "edges"), and vertices. Examples of structural features are shown in FIGS. 2, 3, and 15.

The inorganic nanocages may have a fully empty interior. The apertures of the inorganic nanocage may connect the interior of the inorganic nanocage to the outside environment. That is, material from the outside environment may pass through an aperture into the interior of the inorganic nanocage. The inorganic nanocages have fully empty interior, while there are open windows on the cages connecting the inside and outside.

The point at which several arms (edges) meet is referred to as a vertice. The vertices of the inorganic nanocages may have a longest linear dimension (e.g., a diameter) about 1 to about 5 nm, including every 0.1 nm value and range therebetween. The arms connecting two nearby vertices of the inorganic nanocages may have a longest linear dimension (e.g., diameter) of less than 1 to about 3 nm or less than or equal to 1 to about 5 nm. For example, the struts of the inorganic nanocages are around 2 nm thick and only contain a few atoms across the cross-section.

An inorganic nanocage has a plurality of apertures. The apertures can have various shapes. The inorganic nanocage may have apertures having all the same shape or have apertures having two or more shapes. The apertures may independently have a size (e.g., a longest dimension in a plane defining the aperture), such as, for example, a diameter, of 1 to 10 nm, including all 0.1 nm value and ranges therebetween. The apertures may have a size of 2 to 7 nm. The apertures (i.e., windows) of the inorganic nanocages may have a longest linear dimension (e.g., a diameter) of about 1 nm to about 5 nm, including every 0.1 nm value and range therebetween. For example, in a nanocage, a portion of the vertices and a portion of the arms define a polygon and an aperture defines at least a portion of that polygon.

The size of the inorganic nanocages may be determined by both the geometry of cage structure and the composition of materials, while the aperture (i.e., window) sizes may be similar or different form the cages containing same material composition but with different structure geometries.

In an example, dodecahedral silica nanocages have an average diameter around 12 nm. In comparison, silica inorganic nanocages with the more complex geometries, such as buckyballs, are substantially bigger, while the silica nanocages with the simpler geometries, such as tetrahedral cages, are smaller.

When silica is replaced by other metallic materials (e.g., gold and silver), the size of the inorganic nanocages may be slightly changed (e.g., reduced). When the nanocage composition is metallic, the inorganic nanocages may be crystalline (e.g., crystalline on the atomic scale).

The inorganic nanocages can have desirable surface area. The inorganic nanocages may have a surface area of 500 to 800 $m^2/g$, including all integer $m^2/g$ values and ranges therebetween. The surface area may be determined by methods known in the art. In an example, the surface area is determined by BET analysis of nitrogen sorption isotherms.

The inorganic nanocages may be functionalized. The inorganic nanocages can be functionalized using various methods. At least a portion of a surface (e.g., at least a portion of an exterior surface and/or at least a portion of an interior surface of the inorganic nanocages may be functionalized (e.g., covalently functionalized and/or non-covalently functionalized).

The inorganic nanocages may be selectively functionalized. The functionalization may be the same for the interior surface and exterior surface of the inorganic nanocages or may be different for the interior surface and exterior surface of the inorganic nanocages.

The interior (inner) and exterior (outer) surface of the inorganic nanocages may be selectively modified with desired functional groups via both covalent and non-covalent interactions for different applications. For example, the exterior surface of the inorganic nanocages can be covalently functionalized with polyethylene glycol for improving bio-compatibility. In another example, the outer surface of the inorganic nanocages can be further covalently functionalized with ligand groups for theranostics applications, including but not limited to peptides, RNAs, DNAs, drug molecules, sensor ligands (e.g., sensor ligands comprising one or more sensor molecule(s)), antibodies, antibody fragments, radioisotopes, and the like, and combinations thereof. The silica matrix of the silica nanocages may be covalently labeled with a fluorescent dye to endow the cages with fluorescence properties (e.g., allowing fluorescent imaging of the inorganic nanocages).

A composition may comprise homostacks of individual layers of the same inorganic mesoporous materials. A composition may comprise heterostacks of individual layers of inorganic mesoporous materials, where at least two of the individual layers are different.

In various examples, a composition (e.g., a porous heterostack) is one which different numbers, L, of individual layers (e.g., porous 2D superlattices (which may be homostacks), e.g., L =1-1,000 or 2-1,000, or preferably L=1-100 or 2-100, or more preferably L=1-10 or 2-10, are stacked on top of each other. The following are non-limiting examples of different ways of choosing the composition of a porous heterostack (see, e.g., FIG. 4a-c):

The porous heterostack comprises 2D superlattices of the same material, e.g., superlattices from porous silica nanocages only, but different orientation relative to each other. (E.g., if the superlattice is a hexagonal superlattice, then one may rotate one superlattice relative to the other in the heterostack around the six-fold symmetry axis, so that Moiré patterns result, as described in the Example and FIG. 4d-h).

The porous heterostack comprises 2D superlattices made from porous nanocages of one or more or all different materials. For example, a porous heterostack is made from 2D superlattices or porous nanocages made from amorphous silicates, amorphous aluminosilicates, amorphous, semicrystalline, or fully crystalline transition metal oxides, metals, or the like, or a combination thereof. Or the heterostack may be made from 2D superlattices of porous nanocages that are decorated with one or more or all different catalytically active metal nanoparticles (for tandem catalysis). The sequence of such chemically distinct 2D superlattices (homostacks) within the heterostack may be varied.

The porous heterostack may be made combining any of the three different ways of varying the porous 2D superlattices (homostacks) within the heterostack, i.e., from porous superlattices with different orientations, made from different materials (or decorated with different catalytically active metal nanoparticles), and different thickness.

In an aspect, the present disclosure provides methods of making compositions of the present disclosure. Non-limiting examples of methods are provided herein (e.g., in the Examples, Statements, and claims).

Without intending to be bound by any particular theory, it is considered that an important criterion to obtain ordered porous structures is the formation of micelles with narrow size distribution and well-defined shape. FIG. 17 shows an example of a porous silica nanosheet synthesized with a mixture of $C_{16}TAB$ and BrijL4 as the surfactants. The pores are not particularly monodisperse and do not show any order. Another example of disordered porous nanosheets is provided in FIG. 10c of Example 1. In this case, the nanosheets were synthesized with styrene as the organic solvent, resulting in ill-defined cylindrical micelles and also not ordered structures.

Without intending to be bound by any particular theory, it is considered that the porous structure of the composition may be controlled by changing the pH, the organic solvent(s), the surfactant(s) or a combination thereof. As illustrative examples, lamellar structure is obtained by using chloroform as the organic solvent, or ccp and hcp structures are obtained by increasing the pH, clathrate-like structures are obtained by using mixture of short and long surfactants.

The methods may provide compositions with desirable pore structure. The pore structure may have a narrow pore size distribution. Without intending to be bound by any particular theory, it is considered that narrow pore size distribution results from the formation of micelles with narrow size distribution. This is intrinsic from the formation mechanism. This is controlled by the choice of surfactant, organic solvent and respective concentrations. As illustrated in FIG. 17, a particular surfactant may result in pores with broad size distribution.

Surfactant length can offer direct control over the lattice parameter, e.g., of hexagonal superlattices (see, e.g., FIG. 11). Increasing the surfactant length, e.g., from $C_{12}TAB$ to $C_{18}TAB$, increases the lattice parameter. The choice of surfactant or mixture of surfactants also offers control on the porous structure. Mixtures of short and long surfactants in particular, e.g., $C_8TAB:C_{16}TAB$ or $C_{10}TAB:C_{16}TAB$ mixtures (e.g., 0.5:0.5 molar ratio), give access to clathrate-like structures. Mixtures of cationic and neutral surfactants, e.g., $C_{16}TAB$:BrijL4 mixture (e.g., 0.25:0.75 molar ratio), give access to disordered porous layered structures with large pores (FIG. 17) and porous sphere-like structures (FIG. 18).

In various examples, a method of making a composition (e.g., a superlattice comprising an inorganic mesoporous material) comprising one or more layers of a porous inorganic material and/or an inorganic mesoporous material (e.g., a two-dimensional inorganic mesoporous material), wherein each individual layer of inorganic mesoporous material may comprise 1 to 100 monolayers (e.g., 1 to 20 monolayers) of inorganic nanocages (e.g., a composition of any one of Statement 1-10), comprising: forming a reaction mixture comprising one or more precursor, one or more surfactant, water, and one or more organic solvent(s) (which may be a pore expander or pore expanders and forms a stable liquid-liquid interface with the water) (e.g., the water and organic solvent are immiscible); holding the reaction mixture at a time ($t^1$) and temperature ($T^1$), whereby the composition is formed; optionally, adding a terminating agent to the reaction mixture. A composition comprising two or more layers of porous inorganic material may further comprise repeating the forming, holding, and, optionally, holding for each repetition of forming and holding, a desired number of times (e.g., 1 to 1,000 times, including all integer number of times and ranges therebetween), wherein additional individual layers are formed. The individual layers (e.g., 2 to 1,001 layers, including all integer number of times and ranges therebetween) may stacked to form a composition comprising two or more layers of porous inorganic material. Methods of stacking individual layers are known in the art. In various examples, the individual layers are stacked by mechanical transfer (such as, for example, by stamping, or the like), Langmuir-Schaefer depositions, which may be carried out directly from the liquid-liquid interface, and the like.

A composition may be formed at the liquid-liquid interface between the water and organic solvent. A composition may be formed from the product of two or more individual reactions (e.g., stacking the products of two or more individual reactions), which may be carried out under the same or similar conditions or at least two of the individual reactions are carried out under different conditions (e.g., one or more of the reactants, one or more of the reactant amounts or relative amounts, time, temperature, other reaction conditions (e.g., pH), or the like, or a combination thereof is different).

Various surfactants can be used. A combination of surfactants may be used. In various examples, the one or more surfactant is chosen from $C_8$ to $C_{18}$ alkyltrimethylammonium halides, sodium dodecyl sulfate (SDS), N-myristoyl-L-glutamic acid ($C_{14}$GluA), and combinations thereof, and/or the one or more pore expander chosen from trialkylated benzenes, polymer monomers, hydrophobic solvents, and combinations thereof. In various examples, the surfactant(s) is/are chosen from cationic surfactants (e.g., $C_8$ to $C_{18}$ alkyltrimethylammonium halides (e.g., octyltrimethylammonium bromide ($C_8$TAB), decyltrimethylammonium bromide ($C_{10}$TAB), dodecyltrimethylammonium bromide ($C_{12}$TAB), myristyltrimethylammonium bromide ($C_{14}$TAB), cetyltrimethylammonium bromide ($C_{16}$TAB or CTAB), octadecyltrimethylammonium bromide ($C_{18}$TAB), and the like), anionic surfactants (e.g., sodium dodecyl sulfate (SDS), N-myristoyl-L-glutamic acid ($C_{14}$GluA, and the like), neutral surfactants (e.g., polyoxyethylene (4) lauryl ether (BrijL4®), and the like), and the like, and combinations thereof.

The surfactant(s) can be present at various amounts in a reaction mixture. In various examples, the one or more surfactant(s) is/are present in the reaction mixture at a concentration of 1 mg/mL to 50 mg/mL, including all 0.1 mg/mL values and ranges therebetween, and the one or more organic solvent (the one or more pore expander) is present at a concentration of from 100 mg/mL to 600 mg/mL, including all 0.1 mg/mL values and ranges therebetween.

The surfactant(s) and organic solvent(s) can be present at various ratios in a reaction mixture. In various examples, the molar ratio of the one or more surfactant to the one or more organic solvent (the one or more pore expander) is 1:100 to 10:1, including all 0.01 values and ranges therebetween or 1:10,000 to 10:1, including all 0.0001 values and ranges therebetween.

Various precursors can be used. Combinations of precursors may be used. In various examples, the one or more precursor(s) is/are one or more non-metal oxide precursor(s), transition metal precursors, and the like, and combinations thereof. Non-limiting examples of non-metal precursors chosen from silica precursors (e.g., alkyltrialkoxysilane precursors, tetraalkoxysilane precursors, and the like, and combinations thereof), functionalized non-metal oxide precursors, and the like, and combinations thereof. Non-limiting examples of transition metal precursors include transition metal salts, transition metal alkoxides, transition metal coordination complexes, organometallic compounds, and the like, and combinations thereof. Non-limiting examples of transition metal salts include gold salts, silver salts, palladium salts, platinum salts, zirconium salts, iron salts, rhodium salts, copper salts, nickel salts, tantalum salts, hafnium salts, niobium salts, and the like, and combinations thereof.

Non-limiting examples of precursors include transition metal oxide precursors, such as, for example, transition metal alkoxides, transition metal salts, and the like, and combinations thereof. Non-limiting examples of transition metal alkoxides include vanadium alkoxides, titanium alkoxides, niobium alkoxides, zirconium alkoxides, tantalum alkoxides, hafnium alkoxides, copper alkoxides, nickel alkoxides, iron alkoxides, and the like, and combinations thereof.

A precursor may comprise one or more functional group(s). In various examples, at least one of the precursors comprises one or more functional group(s). In various examples, the precursor(s) is/are non-metal oxide precursor(s) comprises/comprising one or more functional group(s).

A reaction mixture may comprise a terminating agent. Combinations of terminating agents may be used. Non-limiting examples of terminating agents include poly(ethylene oxide) (PEG), PEG-silanes, and the like. PEG-silane precursors may be used in the case where the precursors are silica precursors.

A PEG-silane may comprise a ligand. In various examples, before or after the PEG-silane conjugate is added, a method further comprises adding a PEG-silane conjugate comprising a ligand (e.g., at room temperature) to the reaction mixture, holding the resulting reaction mixture at a time ($t^2$) and temperature ($T^2$), and subsequently heating the resulting reaction mixture at a time ($t^3$) and temperature ($T^3$), whereby inorganic nanocages surface functionalized with PEG groups comprising a ligand are formed. The resulting reaction mixture may be held for various times (e.g., $t^2$ and $t^3$) and temperatures (e.g., $T^2$ and $T^3$). The determination of times and temperatures is within the purview of one having skill in the art.

A PEG-silane may comprise a reactive group. In various examples, at least a portion of or all of the PEG-silane has a reactive group on a terminus of the PEG group opposite the terminus conjugated to the silane group of the PEG-silane conjugate and after formation of the inorganic nanocages surface functionalized with PEG groups having a reactive group, and, optionally, PEG groups without a reactive group, are reacted with a second ligand functionalized with a second reactive group thereby forming inorganic nanocages surface functionalized with PEG groups functionalized with a second ligand and, optionally, PEG groups.

A terminating agent may be a reducing terminating agent. A reducing terminating agent may be a ligand. Reducing terminating agents may be used in the case where precursors are metal precursors and/or metal oxide precursors. Non-limiting examples of reducing terminating agents include tetrakis(hydroxymethyl)phosphonium chloride (THPC), bis[tetrakis(hydroxymethyl)phosphonium] sulfate (THPS), sodium citrate dihydrate, and the like, and combinations thereof.

A reaction mixture may have various pH values. The pH of the reaction mixture may be important. Without intending to be bound by any particular theory, it is considered that pH is a parameter that may be used to controlling the thickness (e.g., the number of monolayers) of an individual layer. As an illustrative example, increasing the amount of base (i.e., increasing the pH), increases the thickness of (e.g., the number of monolayers forming a) composition (e.g., superlattice) for certain precursors (such as, for example, silica precursors). In various examples, the pH of the reaction mixture is 6 or greater.

Various organic solvents can be used. Combinations of organic solvents may be used. Non-limiting examples of organic solvents include $C_6$-$C_8$ hydrocarbons (e.g., saturated hydrocarbons), which may be a linear, branched, or cyclic hydrocarbon), $C_6$-$C_9$ aromatic hydrocarbons, chlorinated hydrocarbons, and the like, and combinations thereof. Non-limiting examples of organic solvents include cyclohexane, hexane, heptane, benzene, mesitylene, toluene, chloroform, styrene, and the like, and combinations thereof.

The organic solvent(s) may be present in the reaction mixture in various amounts. In various examples, the organic solvent(s) is/are present at a volume ratio of organic solvent(s) (pore expander(s)) to water of 0.1:1 to 1.5:1, including all 0.1 ratio values and ranges therebetween.

Various inorganic nanocages may be formed. At least a portion of a surface of at least a portion of or all of the inorganic nanocages may be functionalized. E.g., functionalized with a metal (which may be a metal alloy), a metal oxide (e.g., a metal oxide comprising a plurality of different metal oxides), or a combination thereof disposed on at least a portion of or all of a surface (e.g., an interior (pore) surface, an exterior surface, or a combination thereof) of the inorganic mesoporous material. The metal and/or metal oxide may be in the form of a plurality of nanoparticles. E.g., the metal is a catalytically active metal, such as, for example, a Group 8, 9, 10, or 11 metal.

A reaction mixture may be held for various times (e.g., t') and temperatures (e.g., $T^1$). The determination of times and temperatures is within the purview of one having skill in the art.

A method may further comprise isolation/separation of at least a portion of the composition (e.g., an individual layer of porous inorganic material) from a reaction mixture. Suitable methods of isolation/separation are known in the art. A method may further comprise stacking of two or more compositions from different reaction mixtures. The compositions may be the same or at least two of the compositions are different.

In an aspect, the present disclosure provides uses of compositions of the present disclosure. Non-limiting examples of uses of compositions of the present disclosure are provided herein (e.g., in the Examples, Statements, and claims).

In various examples, one or more composition(s) is/are used as: catalyst/catalysts/in catalytic methods; separation media/in separation methods; in nanomedicine applications, as a substrate, for example, for supported lipid-bilayer biomaterials, or the like.

A composition may be used for separations or for catalysis. As an illustrative example, in catalysis applications a heterostack with two or more different catalytically active nanoparticles may be used and if a reactant is pushed (e.g., as a gas) through such heterostacks at a given speed, the thickness of the individual layers with a particular catalyst would determine the residence time for that particular catalytic step. By choosing a specific layer thickness, and combination of layers with different catalysts, one may therefore generate porous materials for optimized multistep catalytic conversions (e.g., for a double conversion (e.g., A to B to C), a triple conversion (e.g., A to B to C to D), or the like) one may make heterostacks of three different catalytic 2D superlattices with optimized thickness so as to allow optimized conditions for each of the three conversions in one pass through a composition.

The following Statements describe examples of compositions of the present disclosure, methods of making compositions of the present disclosure, and uses of compositions of the present disclosure:

Statement 1. A composition (e.g., a porous superlattice comprising an inorganic mesoporous material, which may be an inorganic nanocage or inorganic nanocages) comprising:
one or more layers (e.g., 1 to 1,000 individual layers, including all integer number of layers and ranges therebetween) of a porous inorganic material (e.g., a two-dimensional (2D) porous material), the individual layers of porous inorganic material each comprise 1 to 100 (e.g., 1 to 20), including all integer number of monolayers and ranges therebetween, monolayers of porous inorganic nanocages (e.g., mesoporous inorganic nanocages), which may exhibit hexagonal structure. The porous superlattices may comprise mesopores (e.g., pore sizes between 2 and 50 nm, including all 0.1 nm values and ranges therebetween) and, optionally, micropores (e.g., pore sizes below 2 nm). As an illustrative example, a silica nanocage may exhibit microporosity. Pore size means the pores have at least one dimension (which may be the longest dimension of a pore (e.g., a dimension of the aperture of the pore)).

Statement 2. A composition according to Statement 1, wherein the individual layers of the porous inorganic material are the same.

Statement 3. A composition according to Statement 2, wherein one or more or all of the individual layers of the porous inorganic material and/or inorganic mesoporous material are the same in terms of one or more or all of structure (e.g., individual inorganic nanocage structure, thickness (such as, for example, the number of monolayers of inorganic mesoporous material), and the like, and combinations thereof), composition, orientation, or the like, or any combination thereof.

Statement 4. A composition according to Statement 1, wherein one or more of the individual layers of the porous inorganic material and/or inorganic mesoporous material are different from one or more or all of the other layers in terms of one or more or all of structure (e.g., inorganic nanocages, thickness (such as, for example, the number of monolayers of inorganic mesoporous material), and the like, and combinations thereof), composition, orientation, or the like, or any combination thereof.

Statement 5. A composition according to Statement 4, wherein one or more of the layers of the porous inorganic material and/or inorganic mesoporous material are different from one or more or all of the other layers in terms of one or more or all of structure (e.g., thickness, such as, for example, the number of monolayers), composition, orientation, or the like, or any combination thereof.

Statement 6. A composition according to any one of the preceding Statements, wherein, in the case of individual layers comprising only one monolayer, the individual layers of the porous inorganic material and/or inorganic mesoporous material have a thickness of 1 to 125 nm, including all 0.1 nm values and ranges therebetween, 1 to 15 nm, or 5 to 15 nm (e.g., comprise a monolayer of silica cages, aluminosilicate cages, transition metal oxide cages, metal cages, metal oxide cages, or a combination thereof) or, in the case of individual layers comprising multiple monolayers, the individual layers of porous inorganic material and/or inorganic mesoporous material, which may have a thickness of 1 nm to 1 micron, including all 0.1 nm values and ranges therebetween, or 5 nm to 1 micron (e.g., comprise multiple monolayers of silica cages, aluminosilicate cages, transition metal oxide cages, metal cages, metal oxide cages, or a combination thereof).

Statement 7. A composition according to any one of the preceding Statements, wherein the individual layers of the porous inorganic material (e.g., mesoporous inorganic material, microporous inorganic material, mesoporous and microporous material, or the like) have at least one size (e.g., length and/or width), which may be a lateral size, of 10 nm to 1 meter, including all integer nm values and ranges therebetween, and/or an area of 100 nm² to 1 m², including all integer nm² values and ranges therebetween Statement 8. A composition according to any one of the preceding Statements, wherein the individual layers of the porous inorganic material and/or inorganic mesoporous material comprise (or are formed from or are) a silica mesoporous material, aluminosilicate mesoporous material, transition metal oxide mesoporous material, metal mesoporous material, a layer thereof, or a combination thereof.

Statement 9. A composition according to any one of the preceding Statements, wherein the porous inorganic nanocages are independently chosen from pentagonal dodecahedral porous inorganic nanocages (which may be referred to as $5^{12}$ porous inorganic nanocages and comprise 12 pentagonal faces), $5^{12}6^2$, $5^{12}6^4$ porous inorganic nanocages (where $5^n6^m$ refers to cages with n pentagonal and m hexagonal faces on their surface), rhombic dodecahedral, and trapezo-rhombic dodecahedral porous inorganic nanocages. The individual porous inorganic nanocages may be the same in an individual layer or one or more or all of the porous inorganic nanocages in an individual layer are different than the other porous inorganic nanocages.

Statement 10. A composition according to any one of the preceding Statements, wherein one or more of the individual layers of the inorganic mesoporous material comprise (e.g., have) a metal (which may be a metal alloy), a metal oxide (e.g., a metal oxide comprising a plurality of different metal oxides), or a combination thereof disposed on at least a portion of or all of a surface (e.g., an interior (pore) surface, an exterior surface, or a combination thereof) of the porous inorganic material and/or inorganic mesoporous material. The metal and/or metal oxide may be in the form of a plurality of nanoparticles. E.g., the metal is a catalytically active metal, such as, for example, a Group 8, 9, 10, or 11 metal, or a combination thereof.

Statement 11. A composition according to Statement 10, wherein the individual layer(s) comprising (e.g., having) a metal (which may be a metal alloy), a metal oxide (e.g., a metal oxide comprising a mixture of metal oxides), or a combination thereof disposed thereon form a discrete region of the composition (e.g., chemically bonded to at least a portion of a surface, which may be an exterior surface, of the composition and/or individual layer of the composition) and the composition comprises one or more such discrete regions.

Statement 12. A composition according to any one of the preceding Statements, wherein the individual nanocages (e.g., the nanocage or nanocages of an individual layer of porous inorganic material or a monolayer of inorganic mesoporous material) are silica nanocages, amorphous silica compositions (for example, amorphous silica compositions such as, for example, organically modified silica, aluminosilicates and the like), amorphous, semicrystalline, or fully crystalline transition metal oxides (for example, transition metal oxides such as, for example, titania, niobia, iron oxide, and the like), or metals (for example, metals such as, for example, gold, silver, and the like, and combinations thereof), or a combination thereof.

Statement 13. A composition according to any one of the preceding Statements, wherein the porous structure (e.g., the individual porous layer structure) of the composition is disordered or ordered (e.g., highly ordered).

Statement 14. A composition according to any one of the preceding Statements, wherein the porous structure of the composition is ordered and, for example, the composition has a structure has a hexagonal, lamellar, cubic close packed (ccp), hexagonal close packed (hcp), or quasicrystalline structure.

Statement 15. A composition according to any one of the preceding Statements, wherein the composition further comprises a substrate and at least a portion or all of an exterior surface of an exterior individual layer of the composition is disposed on at least a portion of or all of an exterior surface of the substrate. Non-limiting examples of substrates (or examples of materials of which a substrate is comprised) include porous polymeric materials (e.g., porous polymer materials and the like), dense substrates (e.g., glass, silicon (such as, for example, silicon wafers), aluminum, and the like), porous substrates (e.g. bulk mesoporous silica, porous ceramics, porous polymer materials, and the like), silicones (e.g., polydimethylsiloxane and the like), mesh substrates (e.g., metal mesh, polymer fiber mesh, carbon mesh, and the like), textiles (e.g., cotton fabric and the like), adhesive polymer layers, thermal release tapes, and the like.

Statement 16. A composition according to any one of the preceding Statements, wherein the composition (e.g., the pores of the composition or the inorganic nanocages of the composition) exhibits periodicity in at least a portion of or all of the composition. The composition (e.g., compositions comprising individual layers comprising 2 or more, 3 or more, or 4 or more 2D layers, which may be monolayers) may exhibit crystallographic registration (e.g., of the inorganic nanocages) (e.g., 90% or more, 95% or more 99% or more, or all of the of the inorganic nanocages exhibit crystallographic registration) and, optionally, individual inorganic nanocages (e.g., transition metal nanocages, transition metal oxide nanocages, metal nanocages, metal oxide nanocages, and combinations thereof), may be single crystalline or comprise one or more single-crystalline domains (e.g., one or more single-crystalline domains up to one square meter in area) or be polycrystalline (e.g., polycrystalline at the atomic scale).

Statement 17. A composition according to any one of the preceding Statements, wherein the porous structure of the composition, which may have an ordered pore structure, wherein the pore size distribution of the composition (which may be a membrane) is narrow (e.g., 90%, 95%, 99%, or 99.9% or 100% of the pores have a size ±10% of average pore size.

Statement 18. A method of making a composition (e.g., a superlattice comprising an inorganic mesoporous material) comprising one or more layers of a porous inorganic material and/or an inorganic mesoporous material (e.g., a two-dimensional inorganic mesoporous material), wherein each individual layer of inorganic mesoporous material comprises 1 to 100 (e.g., 1 to 20) monolayers of inorganic nanocages (e.g., a composition of any one of Statement 1-10), comprising: forming a reaction mixture comprising one or more precursor(s), one or more surfactant(s), water, optionally, one or more pH modifying agent(s) (e.g., a base, an acid, or the like), and one or more organic solvent(s) (which may be a pore expander or pore expanders and forms a stable liquid-liquid interface with the water) (e.g., the water and organic solvent are immiscible); holding the reaction mixture at a time ($t^1$) and temperature ($T^1$), whereby the individual layer or composition is formed; optionally, adding a terminating agent to the reaction mixture, wherein an individual layer of porous inorganic material is formed, and optionally, repeating the forming, holding, and, optionally, holding for each repetition of forming and holding, a desired number of times (e.g., 1 to 1000 times, including all integer number of times and ranges therebetween) to form additional individual layers, which may be stacked, wherein the composition is formed.

Statement 19. A method according to Statement 18, wherein the one or more surfactant(s) is/are chosen from $C_8$ to $C_{18}$ alkyltrimethylammonium halides, sodium dodecyl sulfate (SDS), N-myristoyl-L-glutamic acid ($C_{14}$GluA), and combinations thereof, and/or the one or more organic solvent(s) (which may be pore expander(s)) is/are chosen from trialkylated benzenes, polymer monomers, hydrophobic solvents, and combinations thereof.

Statement 20. A method according to Statement 18 or 19, wherein the surfactant(s) is/are chosen from cationic surfactants (e.g., $C_8$ to $C_{18}$ alkyltrimethylammonium halides (e.g., octyltrimethylammonium bromide ($C_8$TAB), decyltrimethylammonium bromide ($C_{10}$TAB), dodecyltrimethylammonium bromide ($C_{12}$TAB), myristyltrimethylammonium bromide ($C_{14}$TAB), cetyltrimethylammonium bromide ($C_{16}$TAB or CTAB), octadecyltrimethylammonium bromide ($C_{18}$TAB), and the like)), anionic surfactants (e.g., sodium dodecyl sulfate (SDS), N-myristoyl-L-glutamic acid ($C_{14}$GluA, and the like), neutral surfactants (e.g., polyoxyethylene (4) lauryl ether (BrijL4®), and the like), and the like, and combinations thereof.

Statement 21. A method according to any one of Statement 18-20, wherein the one or more surfactant(s) is/are present in the reaction mixture at a concentration of 1 mg/mL to 50 mg/mL, including all 0.1 mg/ml values and ranges therebetween, and the one or more organic solvent(s) (e.g., the one or more pore expander(s)) is/are present at a concentration of from 100 mg/mL to 600 mg/mL, including all 0.1 mg/ml values and ranges therebetween.

Statement 22. A method according to any one of Statements 18-21, wherein the molar ratio of the one or more surfactant(s) to the one or more organic solvent(s) (e.g., the one or more pore expander) is 1:100 to 10:1, including all 0.01 values and ranges therebetween or 1:10,000 to 10:1, including all 0.0001 values and ranges therebetween.

Statement 23. A method according to any one of Statements 18-22, wherein the one or more precursor(s) is/are one or more non-metal oxide precursor(s) chosen from silica precursors (e.g., tetraalkoxysilane precursors, alkyltrialkoxysilanes precursors, and the like, and combinations thereof) functionalized non-metal oxide precursors, and combinations thereof.

Statement 24. A method according to Statement 23, wherein at least one of non-metal oxide precursors comprises one or more functional group(s).

Statement 25. A method according to any one of Statements 18-24, wherein the terminating agent is a PEG-silane.

Statement 26. A method according to Statement 25, wherein before or after the PEG-silane conjugate is added, adding a PEG-silane conjugate comprising a ligand is added at room temperature to the reaction mixture, holding the resulting reaction mixture at a time ($t^2$) and temperature ($T^2$), and subsequently heating the resulting reaction mixture at a time ($t^3$) and temperature ($T^3$), whereby inorganic nanocages surface functionalized with PEG groups comprising a ligand are formed.

Statement 27. A method according to Statement 25 or 26, wherein at least a portion of or all of the PEG-silane has a reactive group on a terminus of the PEG group opposite the terminus conjugated to the silane group of the PEG-silane conjugate and after formation of the inorganic nanocages surface functionalized with PEG groups having a reactive group, and, optionally, PEG groups, are reacted with a second ligand functionalized with a second reactive group thereby forming inorganic nanocages surface functionalized with PEG groups functionalized with a second ligand and, optionally, PEG groups.

Statement 28. A method according to any one of Statements 18-27, wherein the pH of the reaction mixture is 6 or greater.

Statement 29. A method according to any one of Statements 18-22, wherein the one or more precursor(s) is/are one or more transition metal precursor(s) chosen from transition metal salts, transition metal alkoxides, transition metal coordination complexes, organometallic compounds, and the like, and combinations thereof.

Statement 30. A method according to Statement 29, wherein the transition metal salts are gold salts, silver salts, palladium salts, platinum salts, zirconium salts, iron salts, rhodium salts, copper salts, nickel salts, tantalum salts, hafnium salts, niobium salts, and combinations thereof.

Statement 31. A method according to Statement 29 or 30, wherein the terminating agent is a reducing terminating agent.

Statement 32. A method according to Statement 31, wherein the reducing terminating agent is chosen from tetrakis(hydroxymethyl)phosphonium chloride (THPC), bis[tetrakis(hydroxymethyl)phosphonium] sulfate (THPS), sodium citrate dehydrate, and the like, and combinations thereof.

Statement 33. A method according to any one of Statement 18-22, wherein the one or more precursor(s) is/are one or more transition metal oxide precursor(s) chosen from transition metal alkoxides, transition metal salts, and combinations thereof.

Statement 34. A method according to Statement 33, wherein the transition metal alkoxides are chosen from vanadium alkoxides, titanium alkoxides, niobium alkoxides, zirconium alkoxides, tantalum alkoxides, hafnium alkoxides, copper alkoxides, nickel alkoxides, iron alkoxides, and the like, and combinations thereof.

Statement 35. A method according to any one of Statements 18-34, wherein the organic solvent is a $C_6$-$C_8$ hydrocarbon (e.g., a saturated hydrocarbon), which may be a linear, branched, or cyclic hydrocarbon, a $C_6$-$C_9$ aromatic hydrocarbon, chlorinated hydrocarbon, or a combination thereof. Non-limiting examples of organic solvents include cyclohexane, hexane, heptane, benzene, mesitylene, toluene, chloroform, styrene, and combinations thereof.

Statement 36. A method according to any one of Statements 18-35, wherein the organic solvent is present at a volume ratio of organic solvent(s) (pore expander(s)) to water of 0.1:1 to 1.5:1, including all 0.1 ratio values and ranges therebetween.

Statement 37. A method according to any one of Statements 18-36, wherein at least a portion of a surface of at least a portion of or all of the inorganic nanocages is functionalized. E.g., functionalized with a metal (which may be a metal alloy), a metal oxide (e.g., a metal oxide comprising a plurality of different metal oxides), or a combination thereof disposed on at least a portion of or all of a surface (e.g., an interior (pore) surface, an exterior surface, or a combination thereof) of the inorganic mesoporous material. The metal and/or metal oxide may be in the form of a plurality of nanoparticles. E.g., the metal is a catalytically active metal, such as, for example, a Group 8, 9, 10, or 11 metal.

Statement 38. A method according to any one of Statements 18-37, wherein the method further comprises isolation/separation of at least a portion of the composition from the reaction mixture.

Statement 39. A method according to any one of Statements 18-38, wherein the method further comprises stacking of two or more compositions from different reaction mixtures.

Statement 40. A method according to Statement 39, wherein at least two of the compositions are different.

Statement 41. Use of a composition (e.g., a porous superlattice comprising a mesoporous material) comprising one or more layer(s) of a porous inorganic material and/or inorganic mesoporous material (e.g., a two-dimensional mesoporous material), wherein the individual layers of inorganic mesoporous material may comprise 1 to 100 (e.g., 1-20) monolayers of inorganic nanocages) (e.g., a composition of any one of Statements 1-17) or a composition made by a method of the present disclosure (e.g., a composition made by a method of any one of Statements 18 to 41):

as catalysts/in catalytic methods;
as separation media/in separation methods;
in nanomedicine applications,
as a substrate, for example, for supported lipid-bilayer biomaterials,
and the like.

The steps of the method described in the various examples disclosed herein are sufficient to carry out the methods of the present disclosure. Thus, in an example, a method consists essentially of a combination of the steps of the methods disclosed herein. In another example, a method consists of such steps.

The following example is presented to illustrate the present disclosure. It is not intended to be limiting in any matter.

EXAMPLE

This example provides a description of compositions of the present disclosure. The example also provides examples of methods of making compositions of the present disclosure and uses thereof.

Mesoporous silica was synthesized at an interface between two immiscible solvents under conditions leading to the formation of 2D superlattices of silica cages, the thinnest mesoporous silica films synthesized to date. Orientational correlations between cage units increase with increasing layer number controlled via pH, while swelling with oil and mixed surfactants increase micelle size dispersity, leading to complex clathrate type structures in multilayer superlattices. Results suggest that three-dimensional (3D) crystallographic registry within cage-like superlattices emerges as a result of the concerted 3D co-assembly of organic and inorganic components. Mesoporous 2D superlattices can be fabricated over macroscopic film dimensions and stacked on top of each other. Realization of previously inaccessible mesoporous silica heterostructures with separation or catalytic properties unachievable via conventional bulk syntheses is envisioned.

In an attempt to close this knowledge gap and help rationalize observed structure formation, mesoporous silica was assembled at an interface between two immiscible liquids. Careful variation of synthesis conditions allowed the formation of a number of different 2D cage-like silica superlattices with controlled number of monolayers.

Base-catalyzed hydrolysis of alkoxysilane precursors in water produces primary silica clusters of about 2 nm diameter that can further condense to form ultrasmall 10 nm) silica nanoparticles. In the presence of cationic surfactants such as cetyltrimethylammonium bromide (CTAB), negatively charged clusters self-assemble into micelle-templated mesoporous silica, with sizes controllable down to single pore nanoparticles. The addition of a pore expander increases micelle size, size dispersity, and deformability, enabling cage-like mesoporous structures. Numerous studies have identified bulk mesoporous materials formed from such cages as basic building blocks, including $5_{12}$, $5^{12}6^2$, or $5^{12}6^{13}$ cages, where $5^x6^y$ refers to a cage made of x pentagonal and y hexagonal faces. In contrast, details of the self-assembly processes involved in their formation, in particular the transition from a single cage to a 3D superlattice, often remains obscure. In this example, the controlled growth of 2D cage-based mesoporous silica enabled the direct real-space observation of structure evolution and the emergence of 3D order in those superlattices, one monolayer at a time. To the best of our knowledge, no such mesoporous silica films formed from a monolayer of cages have been previously reported. These superlattices constitute a hitherto unknown type of material bridging the field of mesoporous materials with that of 2D materials. For example, borrowing ideas from the field of 2D electronic materials, results open scalable synthetic approaches to mesoporous silica heterostacks with property profiles inaccessible to date.

Results and Discussion. In order to create large liquid-liquid interfacial area for the confined growth of 2D mesoporous superlattices, a relatively large amount of an oil phase, namely cyclohexane, was dispersed in an equivalent volume of water under vigorous stirring, forming large droplets stabilized by CTAB. Tetramethyl orthosilicate (TMOS) was combined with (3-aminopropyl) trimethoxy silane (APTMS) as silica sources. Under basic conditions, neutral aminopropyl groups of APTMS intercalate the surfactant layer due to their hydrophobicity, serving as anchor points for primary silica clusters at the oil-surfactant-water interface. This nucleates silica layer growth at the surface of the oil droplets as verified by fluorescence microscopy (FIG. 1a-b). After removal of surfactant and oil, the ultrathin silica layers enabled unambiguous real-space structure analysis via comparison of transmission electron microscopy (TEM) images with structure models, i.e., without having to rely on reciprocal space analysis from diffraction patterns. This revealed nanosheets with hexagonally packed pores (FIGS. 1b, d) and uniform thickness of only 6-7 nm (FIG. 5). Closer inspection revealed internal pore structures (FIG. 1d) very similar to separately synthesized silica cages (FIG. 1c), including patterns with 2-, 3- and 5-fold symmetry (FIG. 6). Lateral views provided by folds (FIG. 1e and FIG. 7) showed vertical struts and windows rather than solid walls, supporting the assumption that these 2D superlattices are made of a monolayer of cage-like building blocks. The varying strut patterns suggest that a number of different cage orientations and/or cage structures may co-exist in these monolayer 2D superlattices. In this regard, these monolayer superlattices may resemble 2D plastic crystals. Long-range 2D hexagonal order is highlighted by fast Fourier transformation (FFT) of TEM images (FIG. 8). Detailed TEM analysis (FIG. 8c) shows that the building blocks of these monolayer superlattices exhibit very similar dimensions (pore, vertex and edge diameters) as individually synthesized cages, suggesting similarities in their formation mechanism. It was considered that negatively charged silica clusters could adsorb at the water/oil interface attracted by positively charged CTAB surfactant head groups and further stabilized by the hydrophobic aminopropyl groups which intercalate with the CTAB layer. Similar adsorption processes have recently been evidenced in EM images of CTAB micelles decorated with individual silica clusters, an effect which is promoted by the deformability of the surfactant-water interface, which is enhanced by micelle swelling with hydrophobic molecules. In turn, the surfactant molecules wrap around these clusters, increasing the degree of interaction between the organic and inorganic components. In the current case, this creates negatively charged patches on the liquid substrate, which in turn attract CTAB micelles from the water phase that assemble as a single monolayer on the liquid substrate (FIG. 9). Further silica condensation around these micelles completes cage-like silica superlattice formation.

Increasing the amount of oil in the reaction concomitantly increased the chemical yield of silica superlattices (FIG. 10). This is consistent with a larger number of oil droplets increasing their total surface area and with it the interfacial area between the two immiscible liquids where the superlattices form. Changing the oil phase and surfactant length enabled access to superlattices with varying structures and lattice parameters. Using either mesitylene or hexane instead of cyclohexane also resulted in superlattices with 2D hexagonal pore arrangements, whereas using styrene or chloroform resulted in disordered or stripped patterns (FIG. 10). The lattice parameter of the 2D hexagonal structures decreased linearly with surfactant chain length from $C_{18}$TAB to $C_{12}$TAB (FIG. 11). 2D superlattice synthesis can also be realized at a flat liquid-liquid interface in a fully demixed biphasic system under slow stirring (FIG. 12), resulting in large scale superlattices, which fully retained the long-range order. This approach enables scale-up of 2D superlattice synthesis to macroscopic areas, up to the millimeter range (FIG. 13).

Monolayer silica cage-based superlattices grown at the liquid-liquid interface showed asymmetric chemical properties, corroborating the proposed formation mechanism with amine groups as anchoring points to the liquid-liquid interface. This was demonstrated by immersing superlattices sitting on carbon coated TEM grids in a solution of citrate-stabilized gold nanoparticles, which are known to readily bind to amine groups. Only some of the superlattices on the TEM grid got functionalized with gold (FIG. 14a,b), however, whereas others remained completely free of nanoparticles. This suggests that amine groups are concentrated on one side of the superlattice, the one in contact with the oil phase during synthesis. Exchanging native citrate ligands with mercaptoundecanoic acid (MUA) allowed the particles to adopt the hexagonal pattern of the silica superlattice, resulting in an ordered array of gold nanoparticles (FIG. 14c,d), which may be of interest for a number of, for example, plasmonic or catalytic applications.

Silica cage bilayer superlattices were grown by increasing the amount of ammonium hydroxide by a factor 2 (FIG. 2). Bilayer domains were evidenced by lateral views enabled by folds (FIG. 2a,b). These bilayers randomly adopted two different structures at roughly equal proportions (FIG. 2a). One was the dual structure of an equal sphere close packing (FIG. 2c,d). In bulk materials, this corresponds to cubic close packed (ccp) and hexagonal close packed (hcp) structures, whose duals are built from either rhombic dodecahedral (rd) or trapezo-rhombic dodecahedral (trd) cages for ccp and hcp, respectively. These cages result from their different stacking sequence (ABC and ABAB, respectively), thus with only two layers an ambiguity remains as to what type of cages form these domains. The second bilayer structure was an analog to the clathrate IV structure (FIG. 2e,f), which is the dual of the Frank-Kasper Z phase (space group P6/mmm). It is built from $5^{12}$, $5^{12}6^2$ and $5^{12}6^3$ cages assembling into a triangular pattern with the hexagonal faces of the $5^{12}6^2$ cages forming large openings at the corners of each triangle (blue cages in FIG. 2f). In contrast to monolayer superlattices, in bilayer domains the cages are now oriented relative to each other, indicating an increase of order in the cage assembly. However, there still remains ambiguity between the two observed structures, which appeared with the same probability.

Further acceleration of silane hydrolysis rates allowed further increases in layer numbers in turn pushing the system into adopting more specific structures throughout the whole material. Further increasing the amount of ammonium hydroxide relative to monolayer conditions by a factor of 2.5 resulted in superlattices exhibiting a mixture of ccp (space group Fm-3m) and hcp (space group P63/mmc) structures (FIG. 3a,b). From lateral views provided by folds (FIG. 3c), these are multilayer structures made of 3 to 4 layers of cages, which is enough to distinguish their stacking sequence along the c axis of the close packing arrangement and impose a specific cage symmetry. The ccp and hcp structures often coexist in 3D bulk mesoporous silica because of their similarity in packing arrangements. Thanks to the limited thickness of the multilayers, ccp and hcp domains could be unambiguously distinguished directly from top views in TEM images (FIG. 3a). Lateral views of these superlattices exhibited a square pattern (FIG. 3c), consistent with simulated projections for both hcp and ccp structures (FIG. 3b).

While these structures result from the close packing of equal spheres, clathrate-like structures result from the topologically close packing of unequal spheres. It was recently demonstrated that increased size dispersion in surfactant micelle systems with added pore expander (i.e., oil phase) favors the formation of cage-like mesoporous silica with non-uniform cage structures rationalizing the appearance of the clathrate IV structure at twice the ammonium hydroxide concentration. In order to increase the micelle size dispersion and further bias the system towards such structures, two surfactants of different chain lengths ($C_{16}$TAB and $C_8$TAB) were mixed. In conjunction with a 1.5-fold increase of the amount of ammonium hydroxide relative to monolayer conditions to promote multilayer growth, this indeed resulted in superlattices showing exclusively the clathrate IV structure (FIG. 3d-f). The very fine details of the struts forming this structure are consistent with observations from top and lateral views in TEM images (FIG. 3d, f, and FIG. 15a). This structure assignment is corroborated by the occasional presence of square defects (FIG. 15b), which are also built from $5^{12}$ and $5^{12}6^2$ cages with a packing analog to the clathrate I structure (space group Pm-3n, dual structure of the Frank-Kasper A15 phase), and can arrange well with the triangular pattern of this structure. Attempts to grow such superlattices thicker by further increasing the ammonium hydroxide concentration (1.8-fold increase) resulted in the appearance of domains analog to the clathrate II structure (space group Fd-3m, dual structure of the Frank-Kasper $C_{15}$ phase, FIG. 15c), introducing $5^{12}6^4$ cages sharing their base hexagonal face with the $5^{12}6^2$ cages of the clathrate IV structure. The clathrate IV structure has previously only been observed as a defect layer in bulk Fd-3m mesoporous silica (clathrate II structure). In contrast, the growth of a superlattice showing exclusively the clathrate IV structure, instead of the more favorable clathrate II structure, is likely due to the 2D confinement induced by the liquid-liquid interface and limited thickness of the superlattice. This is consistent with the evolution to the clathrate II structure (Fd-3m) in thicker multilayers, where 2D confinement effects are essentially relaxed resembling the situation in the bulk.

Access to well-defined individual 2D cage-like silica superlattices allows fabrication of heterostacks by tuning the angle between layers, their chemical composition, and structure (FIG. 4a-c). FIG. 4d-h provides examples of bilayer superlattices observed as a result of two monolayer pieces falling on top of each other at different angles, yielding well-defined Moiré patterns in TEM. Such stacks of two superlattices formed, for example, during sample preparation for TEM observations, and a large variety of them, showing angular variations not limited to those illustrated in FIG. 4, were found across multiple samples. FIG. 14 can be regarded as proof-of-principle for assemblies from layers with different chemical compositions. To demonstrate the third degree of freedom, a heterostack with varying structures was formed by mixing two different superlattice samples, one with monolayer superlattice and the other with multilayer clathrate IV superlattice (FIG. 16). In these examples, the heterostacks were formed simply by letting the superlattices fall on top of each other during solvent blotting and evaporation. More active methods can be conceived for the fabrication of these heterostacks such as successive mechanical transfer or Langmuir-Schaefer depositions directly from the liquid-liquid interface. In this regard, it might be possible to make use of the chemical asymmetry of these superlattices and the versatile functionalization of silica with a large variety of readily available organosilanes, to induce selectivity in stacking mechanisms and to provide cohesion within these heterostacks. It is envisioned that similar to graphene and other 2D electronic materials, the ability to control structure and composition in such heterostacks layer by layer will open up a large hitherto unavailable design space for mesoporous silica heterostructures with potential separation or catalytic properties not accessible via conventional homogeneous bulk material synthesis.

Experimental Section. Monolayer silica superlattices: For the monolayer superlattices synthesized under vigorous stirring (FIG. 1), cetyltrimethylammonium bromide (CTAB or $C_{16}$TAB, 50 mg) was first dissolved in water (10 mL) at 60° C. in a round bottom flask. After cooling to room temperature, ammonium hydroxide solution (25 μL, 28-30% in water) and cyclohexane (10 mL) were added under stirring at 1200 r.p.m. After 4 hours, a mixture of TMOS (34 μL) and APTMS (25 μL) was added dropwise, and the reaction was left to proceed overnight at room temperature. For the purification of the superlattices, the reaction mixture was centrifuged (7000 g, 10 min) resulting in the complete demixing of the oil and water phases with the product being located at the interface. The upper and bottom phases were carefully removed with a pipette and the product was dispersed in ethanol (10 mL) with help from an ultrasonic probe sonicator. The superlattices were first washed three times with ethanol (10 mL), followed by sonication and centrifugation (7000 g, 10 min). In order to fully remove the surfactant, the superlattices were then dispersed in a mixture of ethanol (10 mL) and acetic acid (50 After sitting for 20 min, the solution was centrifuged and the superlattices washed another three times with ethanol (10 mL), followed by sonication and centrifugation (7000 g, 10 min). Finally, the superlattices were dispersed in ethanol (5 mL).

For the superlattices synthesized under slow stirring (i.e., with the oil and water phases completely demixed, FIG. 2), myristyltrimethylammonium bromide ($C_{14}$TAB, 10 mg) was first dissolved in water (10 mL) at room temperature in a cylindrical beaker. Then, ammonium hydroxide solution (25 μL) was added to the water phase and cyclohexane (10 mL) was slowly added on top. The stirring was set so that the interface remained essentially flat. Early stage experiments showed that using $C_{14}$TAB instead of $C_{16}$TAB helped keeping a smooth interface. In addition, in these experiments the surfactant concentration was kept lower as compared to the syntheses under vigorous stirring in order to account for the smaller surface area between the two phases. Finally, a mixture of TMOS (34 μL) and APTMS (25 μL) was slowly added in the oil phase, directly at the vicinity of the interface with the water phase. After a couple of minutes, flakes of few millimeters in size were seen at the interface, and were scooped on a glass substrate or TEM grid for fluorescence microscopy or TEM analyses, respectively.

Bilayer and multilayer silica superlattices: The bilayer superlattices (FIG. 2) were synthesized using the same procedure as for the monolayer ones, except that 50 μl of ammonium hydroxide solution was added instead of 25 μl. For the multilayer superlattices with mixed hcp (P63/mmc) and ccp (Fm-3m) structures (FIG. 3a-c), 62.5 μl of ammonium hydroxide solution was added instead of 25 μl. For the multilayer superlattices with the clathrate structure IV (P6/mmm) symmetry (FIG. 3d-f), 37.5 μl of ammonium hydroxide solution was added instead of 25 μl and a mixture of 17.4 mg of octyltrimethylammonium bromide ($C_8$TAB) and 25 mg of $C_{16}$TAB (0.5:0.5 molar ratio, as compared to 1 molar equivalent in the monolayer superlattices synthesis) was used instead of employing $C_{16}$TAB only as surfactant. The rest of the procedures and purifications were identical as described for the monolayer superlattices synthesis.

Dye-labeled silica superlattices. For the analysis of the silica superlattices by fluorescence microscopy (inset FIG. 1b, FIG. 10c, and FIG. 11), tetramethylrhodamine-5-maleimide (TMR-mal) dye was first mixed with (3-mercaptopropyl)trimethoxysilane (MPTMS) in dimethyl sulfoxide at a TMR concentration around 0.01 M and a TMR:MPTMS molar ratio around 1:25 at room temperature under nitrogen. The mixture was left statically under nitrogen overnight to conjugate the TMR dye with a silane group (TMR-silane). The resulting TMR-silane conjugate was added into the silica superlattice synthesis solution together with TMOS/APTMS at a TMR:TMOS molar ratio about 1:1000 to label the silica superlattices with fluorescent dye. The rest of the synthesis was the same as for the monolayer superlattices.

Gold nanoparticles. Citrate-stabilized gold nanoparticles with an average size of 4.0 nm were synthesized according to a procedure previously reported in the literature. In a 250 ml three-neck flask equipped with a condenser, 150 ml of water was heated to 70° C. Then, 655 μl of a sodium citrate dihydrate solution (0.5 M), 100 μl of a tannic acid solution (2.5 mM) and 1 ml of a $K_2CO_3$ solution (0.15 M) were added successively. After 5 minutes, 1 ml of a $HAuCl_4.3H_2O$ solution (25 mM) was rapidly added and the reaction was left to proceed for 5 minutes at 70° C., after which the solution was cooled and stored at 4° C. For functionalization with the resulting citrate stabilized gold nanoparticles (FIG. 14a), monolayer superlattices were first deposited on a carbon coated TEM grid as described below and dried overnight. The grid was then immersed in the as-prepared citrate stabilized gold nanoparticle solution for one hour, then briefly immersed for a few seconds in water followed by ethanol, and finally dried in air. For the ordered assembly of gold nanoparticles on the superlattices (FIG. 11b), the citrate ligands were exchanged for 11-mercaptoundecanoic acid (MUA) ligands. To this end, 1 ml of a MUA solution (1 mM in ethanol) and 50 μl of NaOH (0.2 M in water) were added to 10 ml of the as-prepared citrate-stabilized gold nanoparticle solution under stirring. After stirring overnight, 4 mL of the solution of now MUA-stabilized gold nanoparticles was dialyzed (molecular weight cut-off of 10 kDa) for one day in a mixture of 400 mL water, 40 ml MUA (1 mM in ethanol) and 2 ml of NaOH (0.2 M in water). For the ordered attachment of the gold nanoparticles, 5 µl of this solution was dried on a TEM grid, on which superlattices had already been deposited, as described below.

Characterization techniques. For TEM analyses, 8 µl of the superlattices solution diluted five times in ethanol was dropped onto a copper grid coated with a continuous carbon film, and blotted using filter paper. TEM images were acquired using a FEI Tecnai T12 Spirit microscope operated at an acceleration voltage of 120 kV. For fluorescence microscopy, 5 µL of the synthesis solution of dye-labelled silica superlattices was dropped onto a clear glass slide and covered with a thin glass coverslip. The image capture was performed using a Zeiss LSM710 confocal microscope. For atomic force microscopy (AFM) characterization, silicon substrates with a thermally grown ~100 nm thick silicon oxide overlayer were treated in piranha solution (sulfuric acid/hydrogen peroxide=3:1, v/v), rinsed profusely in deionized water and blown dry with nitrogen before use. A drop of the monolayer silica superlattices diluted in ethanol (~0.03 mg/µL) was dropped on the silicon substrate and dried under ambient conditions. AFM data were obtained on a Veeco Nanoscope II SPM with a Nanoscope III controller in tapping mode under ambient conditions using Tapping-Mode Etched Si probes (325 kHz resonance frequency, 27 N/m force constant, 10 nm tip radius of curvature; all other values nominal). Flatten and/or plane fit functions were applied to the AFM data using the Nanoscope Analysis 1.50 software.

Although the present disclosure has been described with respect to one or more particular embodiment(s) and/or example(s), it will be understood that other embodiments and/or examples of the present disclosure may be made without departing from the scope of the present disclosure.

The invention claimed is:

1. A method of making a composition comprising two or more layer(s) of an inorganic mesoporous material, wherein each individual layer of inorganic mesoporous material comprises 1 to 100 monolayers of inorganic nanocages, the method comprising:
   forming a reaction mixture comprising one or more precursor(s),
   one or more surfactant(s),
   water,
   optionally, one or more pH modifying agent(s), and
   one or more organic solvent(s),
   holding the reaction mixture at a time (t1) and temperature (T1); and
   optionally, adding a terminating agent to the reaction mixture, whereby an individual layer of inorganic mesoporous material is formed; and
   repeating the forming, holding, and, optionally, holding for each repetition of forming and holding, a desired number of times, whereby one or more additional individual layers of inorganic mesoporous materials are formed; and
   stacking the individual layer and additional individual layer(s), wherein at least two of the individual layer and/or the additional layer(s) are from different reaction mixtures and wherein the composition is formed.

2. The method of claim 1, wherein at least a portion of a surface of at least a portion of or all of the inorganic nanocages is/are functionalized.

3. The method of claim 1, wherein
   the one or more surfactant(s) is/are chosen from $C_8$ to $C_{18}$ alkyltrimethylammonium halides, sodium dodecyl sulfate, N-myristoyl-L-glutamic acid, and combinations thereof, and/or
   the one or more organic solvent(s) is/are chosen from trialkylated benzenes, polymer monomers, hydrophobic solvents, and combinations thereof.

4. The method of claim 1, wherein the one or more surfactant(s) is/are chosen from cationic surfactants, anionic surfactants, neutral surfactants, and combinations thereof.

5. The method of claim 1, wherein the one or more surfactant(s) is/are present in the reaction mixture at a concentration of 1 mg/mL to 50 mg/mL and/or the one or more organic solvent(s) is/are present at a concentration of from 100 mg/mL to 600 mg/mL.

6. The method of claim 1, wherein the molar ratio of the one or more surfactant(s) to the one or more organic solvent(s) is 1:10,000 to 10:1.

7. The method of claim 1, wherein the one or more precursor(s) is/are one or more non-metal oxide precursor(s) chosen from silica precursors, alkyltrialkoxysilane precursors, tetraalkoxysilane precursors, functionalized non-metal oxide precursors, and combinations thereof.

8. The method of claim 7, wherein at least one of non-metal oxide precursors comprises one or more functional group(s).

9. The method of claim 1, wherein the terminating agent is a PEG-silane conjugate.

10. The method of claim 9, wherein before or after the PEG-silane conjugate is added, the method further comprises
    adding a PEG-silane conjugate comprising a ligand at room temperature to the reaction mixture,
    holding the resulting reaction mixture at a time (t2) and temperature (T2), and
    subsequently heating the resulting reaction mixture at a time (t3) and temperature (T3), whereby inorganic nanocages surface functionalized with PEG groups comprising a ligand are formed.

11. The method of claim 9, wherein at least a portion of or all of the PEG-silane comprises a reactive group on a terminus of the PEG group of the PEG-silane conjugate opposite the terminus conjugated to the silane group of the PEG-silane conjugate and after formation of inorganic nanocages surface functionalized with PEG groups having a reactive group, and, optionally, PEG groups, are reacted with a second ligand functionalized with a second reactive group thereby forming inorganic nanocages surface functionalized with PEG groups functionalized with a second ligand and, optionally, PEG groups.

12. The method of claim 1, wherein the pH of the reaction mixture is 6 or greater.

13. The method of claim 1, wherein the one or more precursor(s) is/are one or more transition metal precursor(s) chosen from transition metal salts, transition metal alkoxides, transition metal coordination complexes, organometallic compounds, and combinations thereof.

14. The method of claim 13, wherein the transition metal salts are chosen from gold salts, silver salts, palladium salts, platinum salts, zirconium salts, iron salts, rhodium salts, copper salts, nickel salts, tantalum salts, hafnium salts, niobium salts, and combinations thereof.

15. The method of claim 13, wherein the terminating agent is a reducing terminating agent.

16. The method of claim 15, wherein the reducing terminating agent is chosen from tetrakis(hydroxymethyl)phosphonium chloride (THPC), bis[tetrakis(hydroxymethyl) phosphonium] sulfate (THPS), and combinations thereof.

17. The method of claim 1, wherein the one or more precursor(s) is/are one or more transition metal oxide precursor(s) chosen from transition metal alkoxides, transition metal salts, and combinations thereof.

18. The method of claim 17, wherein the transition metal alkoxides are chosen from vanadium alkoxides, titanium alkoxides, niobium alkoxides, zirconium alkoxides, tantalum alkoxides, hafnium alkoxides, copper alkoxides, nickel alkoxides, iron alkoxides, and combinations thereof.

19. The method of claim 1, wherein the one or more organic solvent(s) is/are present at a volume ratio of organic solvent(s) to water of 0.1:1 to 1.5:1.

20. A method of making a composition comprising one or more layer(s) of an inorganic mesoporous material, wherein each individual layer of inorganic mesoporous material comprises 1 to 100 monolayers of inorganic nanocages, the method comprising:
forming a reaction mixture comprising one or more precursor(s),
one or more surfactant(s),
water,
optionally, one or more pH modifying agent(s), and
one or more organic solvent(s),
wherein the one or more surfactant(s) is/are chosen from $C_8$ to $C_{18}$ alkyltrimethylammonium halides, sodium dodecyl sulfate, N-myristoyl-L-glutamic acid, and combinations thereof and/or the one or more organic solvent(s) is/are chosen from trialkylated benzenes, polymer monomers, hydrophobic solvents, and combinations thereof and/or the one or more organic solvent(s) is/are present at a volume ratio of organic solvent(s) to water of 0.1:1 to 1.5:1 and/or the pH of the reaction mixture is 6 or greater,
holding the reaction mixture at a time (t1) and temperature (T1); and
optionally, adding a terminating agent to the reaction mixture, whereby an individual layer of inorganic mesoporous material is formed; and
optionally, repeating the forming, holding, and, optionally, holding for each repetition of forming and holding, a desired number of times, whereby one or more additional 15 individual layers of inorganic mesoporous materials are formed; and
optionally, stacking the individual layer and additional individual layer(s), wherein the composition is formed.

21. A method of making a composition comprising one or more layer(s) of an inorganic mesoporous material, wherein each individual layer of inorganic mesoporous material comprises 1 to 100 monolayers of inorganic nanocages, the method comprising:
forming a reaction mixture comprising one or more precursor(s),
one or more surfactant(s),
water,
optionally, one or more pH modifying agent(s), and
one or more organic solvent(s),
holding the reaction mixture at a time (t1) and temperature (T1); and
adding a terminating agent to the reaction mixture, wherein the terminating agent is a PEG-silane conjugate, whereby an individual layer of inorganic mesoporous material is formed; and
optionally, repeating the forming, holding, and, optionally, holding for each repetition of forming and holding, a desired number of times, whereby one or more additional 15 individual layers of inorganic mesoporous materials are formed; and
optionally, stacking the individual layer and additional individual layer(s), wherein the composition is formed.

* * * * *